United States Patent [19]

Sasajima

[11] Patent Number: 5,625,503
[45] Date of Patent: Apr. 29, 1997

[54] MAGNETIC RECORDING AND REPRODUCING APPARATUS HAVING MEANS FOR DISCRIMINATING PERFORMANCE OF MAGNETIC RECORDING MEDIUM TO ACHIEVE OPTIMUM RECORDING AND REPRODUCTION

[75] Inventor: Yasutaka Sasajima, Kanagawa-ken, Japan

[73] Assignee: Victor Company of Japan, Ltd., Japan

[21] Appl. No.: 530,696

[22] Filed: Sep. 19, 1995

[30] Foreign Application Priority Data

Sep. 20, 1994 [JP] Japan .................................. 6-252931
Sep. 27, 1994 [JP] Japan .................................. 6-257628

[51] Int. Cl.$^6$ .................................................. G11B 5/02
[52] U.S. Cl. .................. 360/25; 360/27; 360/66; 360/31; 360/68
[58] Field of Search .................. 360/27, 25, 66, 360/31, 35.1, 10.3, 67, 68, 61, 62, 63, 64, 65; 369/47, 58; 386/8, 68, 74, 81

[56] References Cited

U.S. PATENT DOCUMENTS 4,879,609  11/1989  Kozuki ........................ 360/66
5,196,967  3/1993   Mederer ...................... 360/66
5,452,146  9/1995   Okamoto ...................... 360/27

FOREIGN PATENT DOCUMENTS 2-134705   5/1990   Japan .
3-245302  10/1991   Japan .
5-197907   8/1993   Japan .
5-314408  11/1993   Japan .
6-76212    3/1994   Japan .

Primary Examiner—Aristotelis Psitos
Assistant Examiner—Alan Faber
Attorney, Agent, or Firm—Ladas & Parry

[57] ABSTRACT

A magnetic recording and reproducing apparatus records a signal on a recording track of a magnetic recording medium in a recording mode and reproduces the signal from the recording track of the magnetic recording medium in a reproducing mode. The apparatus includes a rotary drum having at least first and second magnetic heads having gaps with mutually different azimuth angles, an erasing circuit for erasing the signal recorded on the recording track of the magnetic recording medium by supplying a high-frequency current to the first magnetic head in a state where the magnetic recording medium which makes contact with the rotary drum is stationary, a recording circuit for supplying a predetermined signal to the second magnetic head so as to record the predetermined signal on the recording track which is erased by the erasing circuit, a detector for detecting the predetermined signal by immediately reproducing by the second magnetic head the predetermined signal which is recorded on the recording track by the recording circuit, and a controller including a mechanism for discriminating a signal recording and reproducing characteristic of the magnetic recording medium based on the predetermined signal detected by the detector.

15 Claims, 22 Drawing Sheets

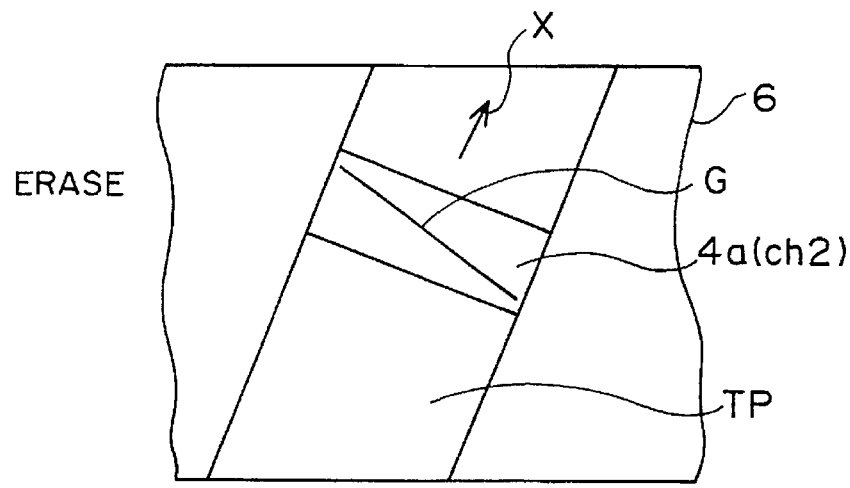
FIG. 4A ERASE
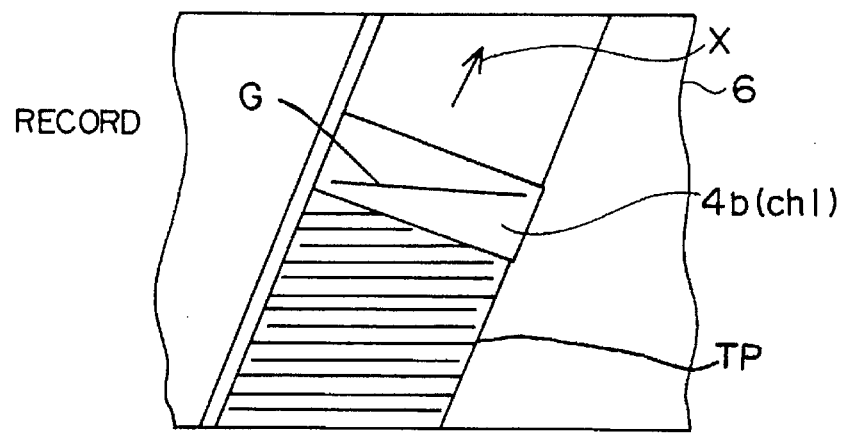
FIG. 4B RECORD
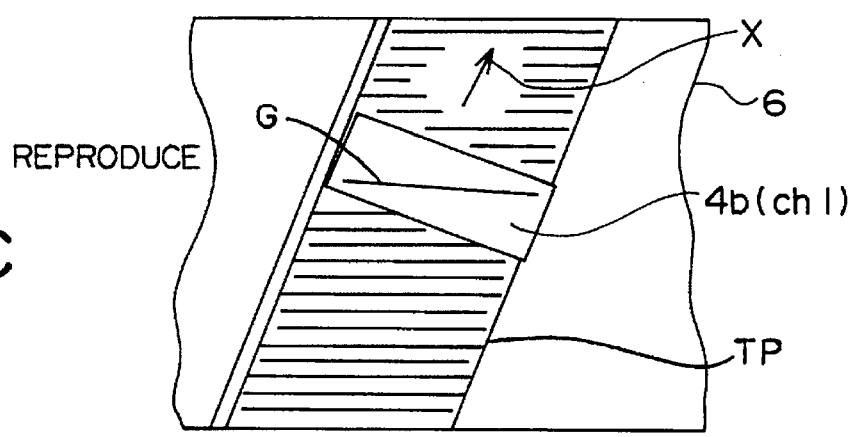
FIG. 4C REPRODUCE

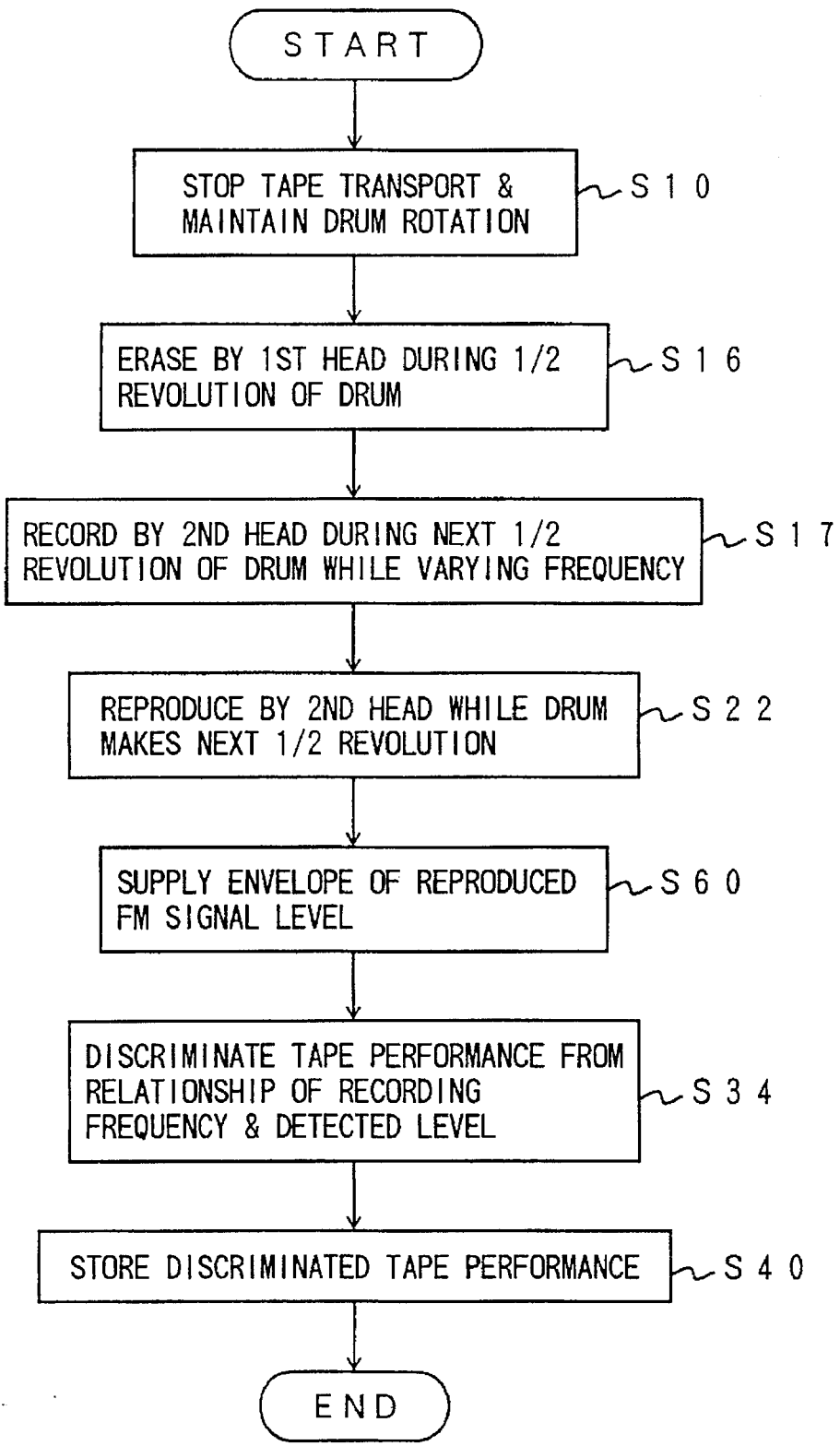

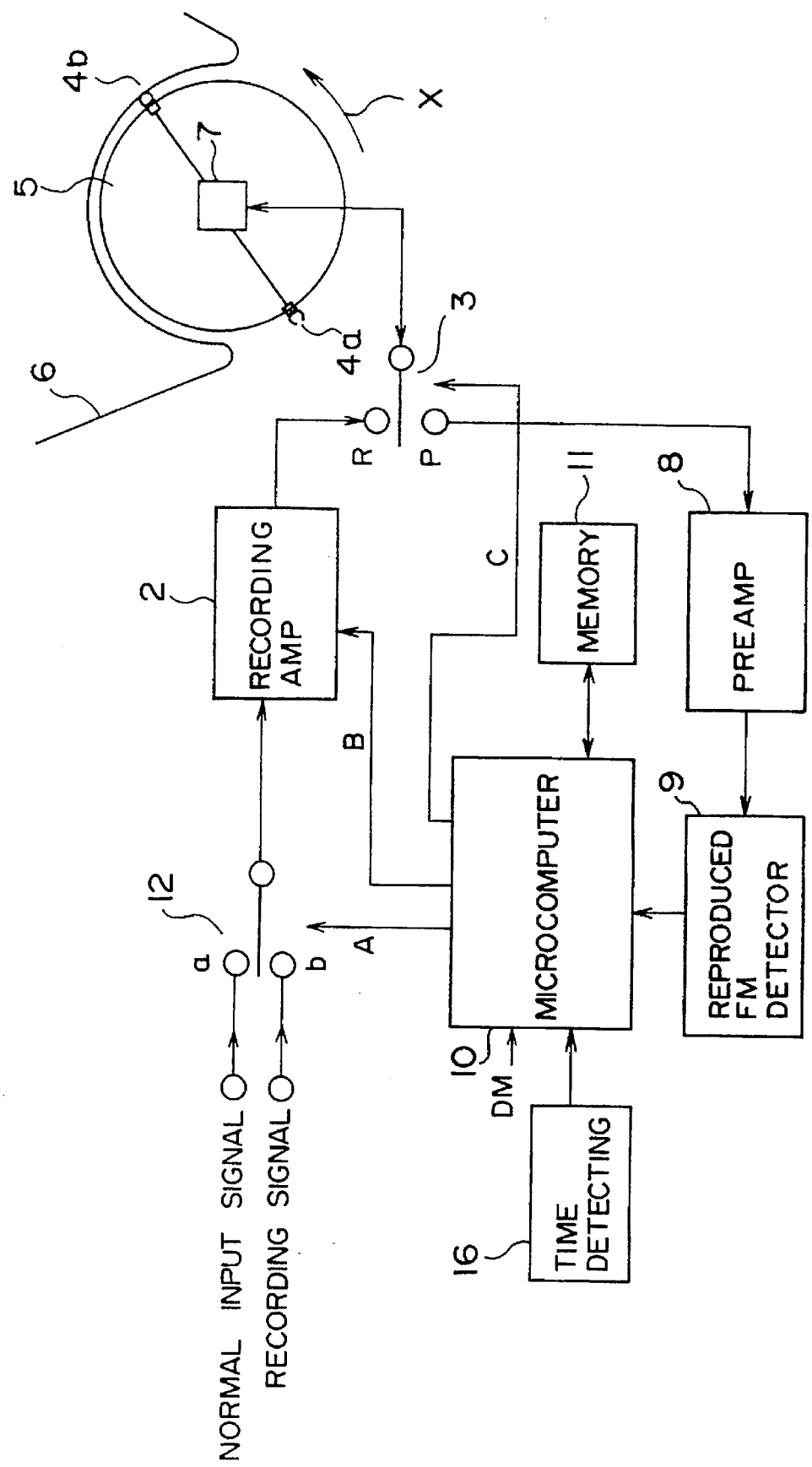

MAGNETIC RECORDING AND REPRODUCING APPARATUS HAVING MEANS FOR DISCRIMINATING PERFORMANCE OF MAGNETIC RECORDING MEDIUM TO ACHIEVE OPTIMUM RECORDING AND REPRODUCTION

BACKGROUND OF THE INVENTION

The present invention generally relates to magnetic recording and reproducing apparatuses, and more particularly to a magnetic recording and reproducing apparatus which discriminates a performance of a magnetic recording medium in order to record a signal on and reproduce a signal from the magnetic recording medium in an optimum state, and controls a signal recording process and a signal reproducing process based on the discriminated performance of the magnetic recording medium.

In a video tape recording (hereinafter simply referred to as a VTR) which records a video signal on a magnetic recording medium such as a magnetic tape, there is provided a function of discriminating the performance of the magnetic tape so that a desired video signal can be recorded on the magnetic tape in an optimum state.

As one method of discriminating the magnetic tape performance, there was a method which records a tape discriminating signal on the magnetic tape and reproduces the tape discriminating signal, before the desired video signal is actually recorded on the magnetic tape, in order to discriminate the performance and the like of the magnetic tape based on a state of the tape discriminating signal which is reproduced from the magnetic tape. A Japanese Laid-Open Patent Application No.5-314408 proposes a magnetic recording and reproducing apparatus which enables a recording operation to be started by ending the discrimination of the magnetic tape performance within a short time, and is capable of carrying out the signal recording process depending on the magnetic tape performance.

According to this proposed magnetic recording and reproducing apparatus, the tape discriminating signal, that is, a video signal, is recorded on the magnetic tape within the short time while the magnetic tape is not transported and is stationary. For example, this short time is approximately 0.5 second or, is set to a time such that no problem will be introduced from the point of view of discriminating the magnetic tape performance. The magnetic tape performance is discriminated by reproducing the recorded video signal from the magnetic tape within a predetermined time while the magnetic tape is not transported and is stationary. For example, this predetermined time is approximately 0.5 second or, is set to a time such that no problem will be introduced from the point of view of discriminating the magnetic tape performance. However, it may be regarded that, in the proposed magnetic recording and reproducing apparatus, the time required to discriminate the magnetic tape performance is not minimized technically. The Japanese Laid-Open Patent Application No.5-314408 does not show or suggest reducing the time of approximately 0.5 second when discriminating the magnetic tape performance.

On the other hand, when recording a signal on the magnetic tape, a pre-erasure is made in order to ideally reproduce the recorded signal from the magnetic tape and because of the need to prevent undesirable effects of signal components that remain recorded on the magnetic tape. However, in the proposed magnetic recording and reproducing apparatus, no mention is made regarding erasure of prerecorded signals when recording the tape discriminating signal on the magnetic tape. For this reason, the disclosure in the Japanese Laid-Open Patent Application No.5-314408 has problems from the practical point of view.

SUMMARY OF THE INVENTION

Accordingly, it is a general object of the present invention to provide a novel and useful magnetic recording and reproducing apparatus in which the problems described above are eliminated.

Another and more specific object of the present invention is to provide a magnetic recording and reproducing apparatus which technically minimizes a time that is required to discriminate a performance of a magnetic tape.

Still another object of the present invention is to provide a magnetic recording and reproducing apparatus which records a signal on a recording track of a magnetic recording medium in a recording mode and reproduces the signal from the recording track of the magnetic recording medium in a reproducing mode, comprising a rotary drum having at least first and second magnetic heads having gaps with mutually different azimuth angles, erasing means for erasing the signal recorded on the recording track of the magnetic recording medium by supplying a high-frequency current to the first magnetic head in a state where the magnetic recording medium which makes contact with the rotary drum is stationary, recording means for supplying a predetermined signal to the second magnetic head so as to record the predetermined signal on the recording track which is erased by the erasing means, detection means for detecting the predetermined signal by immediately reproducing by the second magnetic head the predetermined signal which is recorded on the recording track by the recording means, and control means including discriminating means for discriminating a signal recording and reproducing characteristic of the magnetic recording medium based on the predetermined signal detected by the detection means. According to the magnetic recording and reproducing apparatus of the present invention, the D.C. power supply used by the erasing means and the D.C. power supply used by the recording means can be provided independently, so that it is possible to positively erase the signal components on the recording track of the magnetic recording medium when discriminating the performance of the magnetic recording medium. For this reason, a stable recording signal can be recorded on the recording track and reproduced from this recording track, thereby making it possible to always obtain a reproduced signal depending on the performance of the magnetic recording medium.

A further object of the present invention is to provide a magnetic recording and reproducing apparatus, wherein the recording means records the predetermined signal which is set with a plurality of gains on the recording track which is erased by the erasing means, and the detection means detects a maximum level of the predetermined signal which is reproduced from the recording track. According to the magnetic recording and reproducing apparatus of the present invention, it is possible to discriminate the performance of the magnetic recording medium depending on the state of the magnetic heads, even if the characteristic itself of the magnetic heads change due to frictional wear or the like. For this reason, it is possible to always carry out an optimum signal recording or reproduction with respect to the magnetic characteristic of the magnetic recording medium.

Another object of the present invention is to provide the magnetic recording and reproducing apparatus, which further comprises first signal processing means for carrying out a first signal processing with respect to a signal to be recorded on the recording track, and second signal processing means for carrying out a second signal processing which is complementary to the first signal processing with respect to the signal reproduced from the recording track. The control means may control the first signal processing means in the recording mode based on the signal recording and reproducing characteristic discriminated by the discriminating means and control the second signal processing means in the reproducing mode based on the signal recording and reproducing characteristic discriminated by the discriminating means. According to the magnetic recording and reproducing apparatus of the present invention, it is possible to carry out an optimum signal recording with respect to the magnetic characteristic of the magnetic recording medium because the first signal processing means can be controlled depending on the performance of the magnetic recording medium. Similarly, it is possible to carry out an optimum signal reproduction with respect to the magnetic characteristic of the magnetic recording medium because the second signal processing means can be controlled depending on the performance of the magnetic recording medium.

Still another object of the present invention is to provide the magnetic recording and reproducing apparatus, wherein the control means controls the first signal processing means in the recording means and controls the second signal processing means in the reproducing mode respectively based on a comparison of the maximum level of the predetermined signal detected by the detection means and a reference value which is set in advance. According to the magnetic recording and reproducing apparatus of the present invention, it is possible to immediately and accurately discriminate the performance of the magnetic recording medium by comparing the D.C. voltage signal of the reproduced signal and the anticipated value. In addition, it is possible to discriminate the optimum performance of the magnetic recording medium each time depending on the user's selection by setting the reference value.

A further object of the present invention is to provide the magnetic recording and reproducing apparatus, wherein the erasing means and the recording means respectively output an erase signal and the predetermined signal based on independent D.C. voltage signals. According to the magnetic recording and reproducing apparatus of the present invention, it is possible to always stably erase the recording track because the erase signal output from the erasing means can be obtained from an independent D.C. voltage signal. In other words, the signals on the recording track can be positively erased by the magnetic head which is supplied with the erase signal even if this magnetic head scans the recording track only once. In addition, since the predetermined signal output from the recording means can be obtained from an independent D.C. voltage signal, it is possible to stable record the predetermined signal on the recording track. That is, the predetermined signal can be positively recorded on the recording track by the magnetic head which is supplied with the predetermined signal even if this magnetic head scans the recording track only once. Furthermore, because the predetermined signal output from the recording means can be obtained from the independent D.C. voltage signal, it is possible to easily vary the frequency of the predetermined signal to a desired value, and the predetermined signal can be set finely so as to enable accurate discrimination of the performance of the magnetic recording medium.

Another object of the present invention is to provide the magnetic recording and reproducing apparatus, wherein the first and second magnetic heads have gaps with mutually opposite azimuth angles. According to the magnetic recording and reproducing apparatus of the present invention, the magnetic head which erases the recording track and the magnetic head which records and reproduces the predetermined signal have the gaps with mutually opposite azimuth angles. For this reason, it is possible to prevent interference of the signal component which is used for the erasure and the predetermined signal on the recording track. In addition, it is possible to improve the utilization efficiency of the first and second magnetic heads on the rotary drum. Since the second magnetic head can record the predetermined signal after the first magnetic head makes the erasure, the signal erasure and the recording of the predetermined signal on the recording track can be made during the time in which the rotary drum makes one revolution.

Still another object of the present invention is to provide the magnetic recording and reproducing apparatus, wherein the erasing means erases the signal on the recording track in synchronism with a timing with which the first magnetic head scans the magnetic recording medium, and the recording means records the predetermined signal on the recording track in synchronism with a timing with which the second magnetic head scans the magnetic recording medium. According to the magnetic recording and reproducing apparatus of the present invention, it is possible to technically minimize the time required to discriminate the performance of the magnetic recording medium because the signal erasure and the recording of the predetermined signal on the recording track can be made in synchronism with a drum pulse signal.

A further object of the present invention is to provide the magnetic recording and reproducing apparatus, which further comprises setting means for setting a recording level of the predetermined signal within a predetermined range, and time detecting means for detecting a time for which the first and second magnetic heads are used, where the control means includes means for variably controlling the predetermined range in which the setting means sets the recording level of the predetermined signal based on the time detected by the time detecting means, and means for setting the recording level with which the predetermined signal detected by the detection means takes a maximum value as an optimum recording level to be set by the setting means. According to the magnetic recording and reproducing apparatus of the present invention, it is possible to set the optimum recording level from a relatively small number of detection points of the recording level. For this reason, it is possible to obtain the optimum recording level even if the frictional wear of the magnetic heads progresses with time and the recording current characteristic of the magnetic heads changes. In other words, the predetermined signal can be recorded in an optimum state depending on the recording current characteristic of the magnetic heads. Moreover, by obtaining the optimum recording level from the level along the recording current characteristic of the magnetic heads, it becomes possible to prevent the recording level from becoming saturated and thus prevent the signal from becoming reproduced in a distorted state. Consequently, it is unnecessary to provide a limiter means.

Another object of the present invention is to provide the magnetic recording and reproducing apparatus, which further comprises setting means for setting a recording level of the predetermined signal within a predetermined range, and time detecting means for detecting a time for which the first and second magnetic heads are used, where the control means includes means for variably controlling the predetermined range in which the setting means sets the recording level of the predetermined signal immediately before the recording means records the predetermined signal on the recording track based on the time detected by the time detecting means, and means for setting the recording level with which the predetermined signal detected by the detection means takes a maximum value as an optimum recording level to be set by the setting means. According to the magnetic recording and reproducing apparatus of the present invention, it is possible to set the optimum recording level every time a desired recording operation is carried out. Hence, it is possible to always record a desired signal in an optimum state depending on the recording current characteristic of the magnetic heads.

Still another object of the present invention is to provide the magnetic recording and reproducing apparatus, which further comprises memory means for storing the optimum recording level set by the control means. According to the magnetic recording and reproducing apparatus of the present invention, it is possible to store the optimum recording level which is obtained for each stage of the frictional wear of the magnetic heads as the frictional wear progresses depending on the time for which the magnetic heads are used. Therefore, it is possible to detect the optimum recording level by a simple operation.

A further object of the present invention is to provide a magnetic recording and reproducing apparatus which records a signal on a recording track of a magnetic recording medium in a recording mode and reproduces the signal from the recording track of the magnetic recording medium in a reproducing mode, comprising a rotary drum having at least first and second magnetic heads having gaps with mutually different azimuth angles, recording means for supplying a predetermined signal to one of the first and second magnetic heads so as to record the predetermined signal on the recording track, detection means for detecting the predetermined signal by immediately reproducing by the one of the first and second magnetic heads the predetermined signal which is recorded on the recording track by the recording means, setting means for setting a recording level of the predetermined signal within a predetermined range, time detecting means for detecting a time for which the first and second magnetic heads are used, and control means including means for variably controlling the predetermined range in which the setting means sets the recording level of the predetermined signal based on the time detected by the time detecting means, and means for setting the recording level with which the predetermined signal detected by the detection means takes a maximum value as an optimum recording level to be set by the setting means. According to the magnetic recording and reproducing apparatus of the present invention, it is possible to set the optimum recording level from a relatively small number of detection points of the recording level. For this reason, it is possible to obtain the optimum recording level even if the frictional wear of the magnetic heads progresses with time and the recording current characteristic of the magnetic heads changes. In other words, the predetermined signal can be recorded in an optimum state depending on the recording current characteristic of the magnetic heads. Moreover, by obtaining the optimum recording level from the level along the recording current characteristic of the magnetic heads, it becomes possible to prevent the recording level from becoming saturated and thus prevent the signal from becoming reproduced in a distorted state. Consequently, it is unnecessary to provide a limiter means.

Another object of the present invention is to provide the magnetic recording and reproducing apparatus, wherein the control means includes means for variably controlling the predetermined range in which the setting means sets the recording level of the predetermined signal immediately before the recording means records the predetermined signal on the recording track based on the time detected by the time detecting means. According to the magnetic recording and reproducing apparatus of the present invention, it is possible to set the optimum recording level every time a desired recording operation is carried out. Hence, it is possible to always record a desired signal in an optimum state depending on the recording current characteristic of the magnetic heads.

Still another object of the present invention is to provide the magnetic recording and reproducing apparatus, which further comprises memory means for storing the optimum recording level set by the control means. According to the magnetic recording and reproducing apparatus of the present invention, it is possible to store the optimum recording level which is obtained for each stage of the frictional wear of the magnetic heads as the frictional wear progresses depending on the time for which the magnetic heads are used. Therefore, it is possible to detect the optimum recording level by a simple operation.

Other objects and further features of the present invention will be apparent from the following detailed description when read in conjunction with the accompanying drawings.

BRIEF DESCRIPTION OF THE DRAWINGS

FIGS. 4A, 4B and 4C respectively are diagrams for explaining tape patterns related to the operation of the first embodiment;

FIG. 17 is a flow chart for explaining the operation of another modification of the first embodiment;

FIG. 19 is a system block diagram showing a fourth embodiment of the magnetic recording and reproducing apparatus according to the present invention;

DESCRIPTION OF THE PREFERRED EMBODIMENTS

Figure 1:
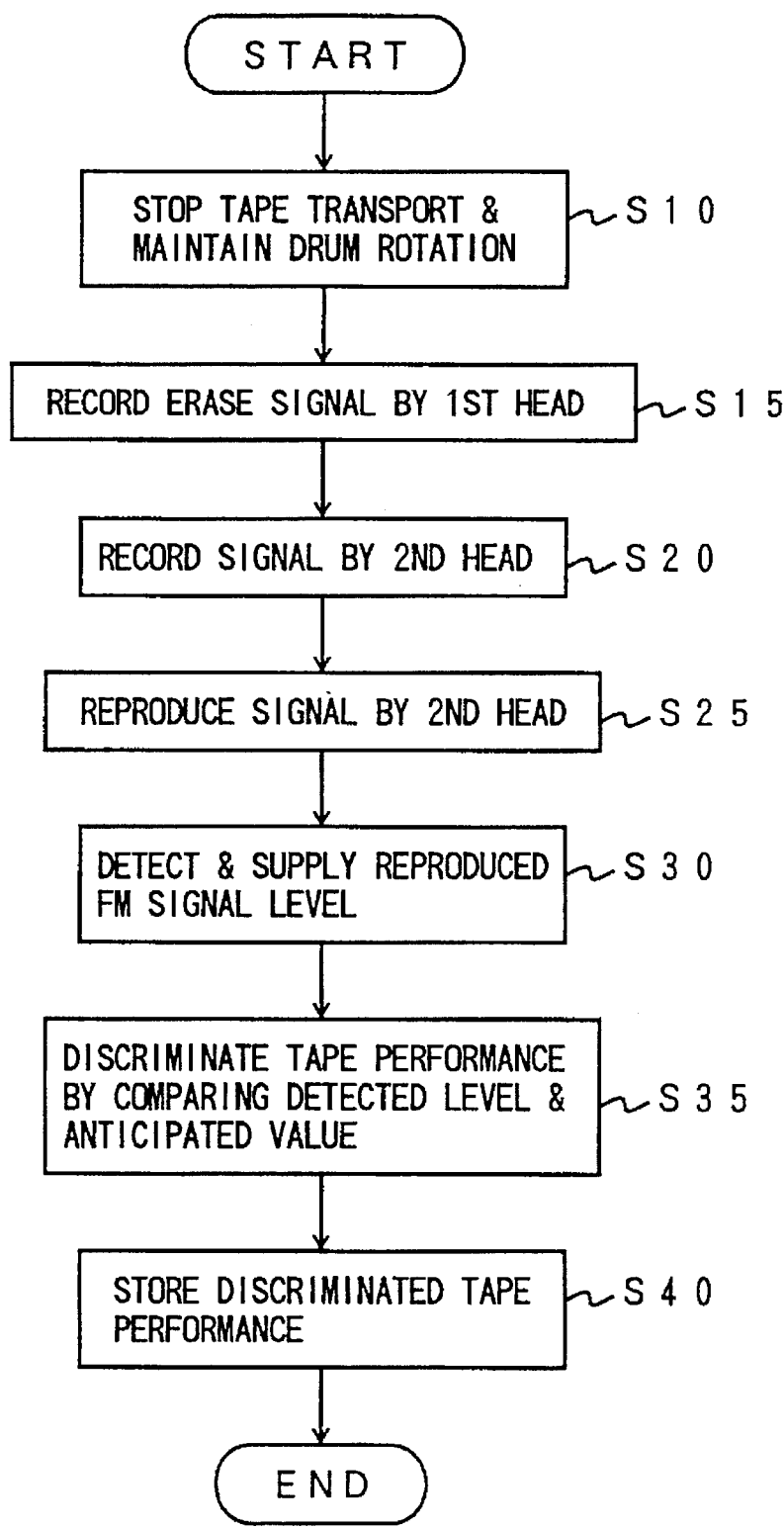
FIG. 1 is a flow chart for explaining the general operation of one aspect of the present invention.

First, a description will be given of the operating principle of one aspect of the present invention, by referring to FIG. 1. FIG. 1 is a flow chart for explaining the general operation of one aspect of the present invention.

In FIG. 1, when a process of a magnetic recording and reproducing apparatus to discriminate a performance of a magnetic tape starts, a step S10 stops driving a tape transport system which transports the magnetic tape, and maintains rotation of a rotary drum which is provided with at least a pair of magnetic heads. A step S15 records an erase signal on a track of the magnetic tape by a first magnetic head, and a step S20 records a predetermined recording signal on the track of the magnetic tape by a second magnetic head. A step S30 detects a level of a FM signal which is reproduced from the track of the magnetic tape. A step S35 discriminates the performance of the magnetic tape by comparing the detected level of the reproduced FM signal and anticipated values. Then, a step S40 stores the discriminated performance of the magnetic tape in a memory, for example, and the process ends.

Figure 2:
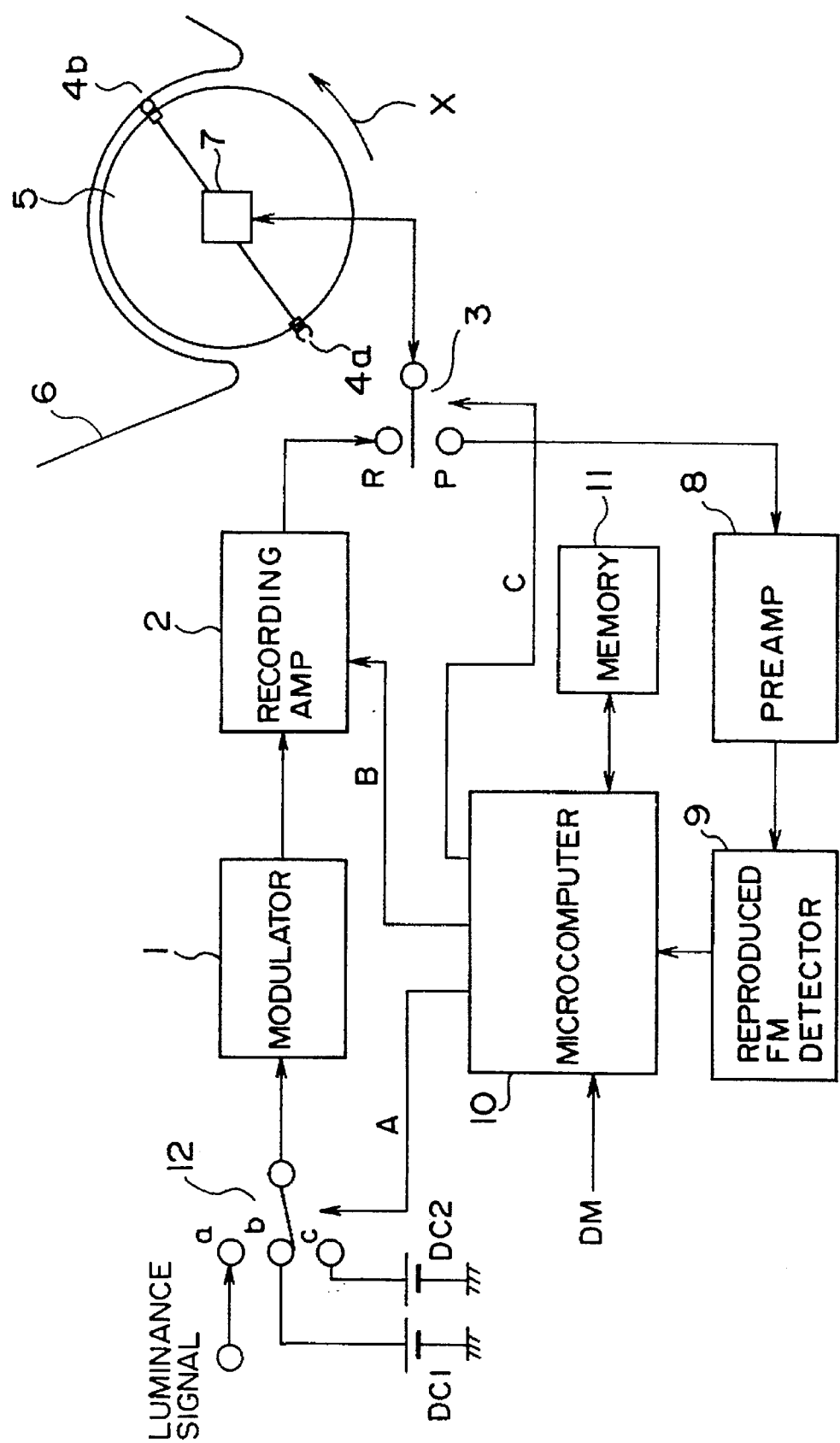
FIG. 2 is a system block diagram showing a first embodiment of a magnetic recording and reproducing apparatus according to the present invention.
Figure 3:
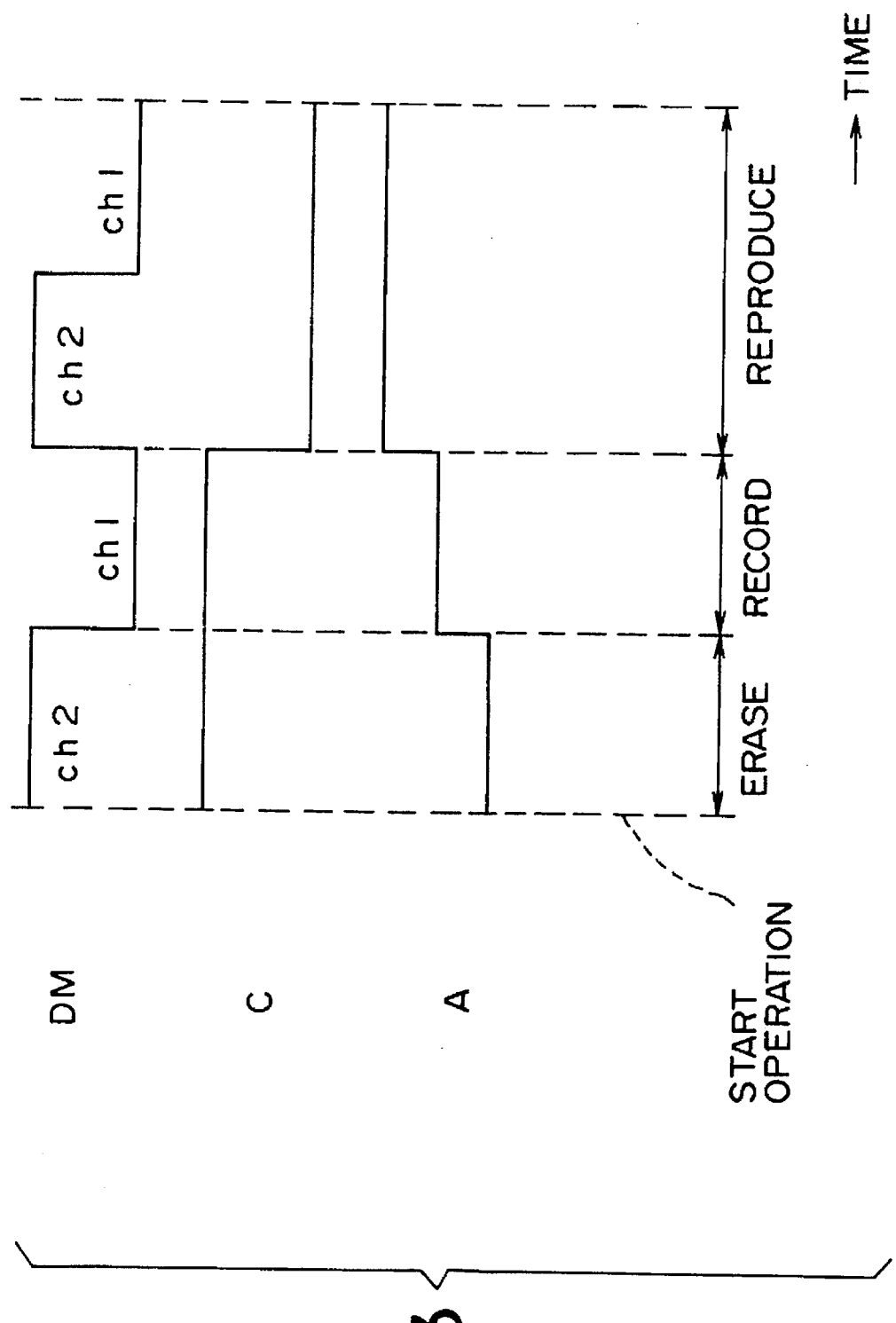
FIG. 3 is a timing chart for explaining the operation of the first embodiment.
Figure 5:
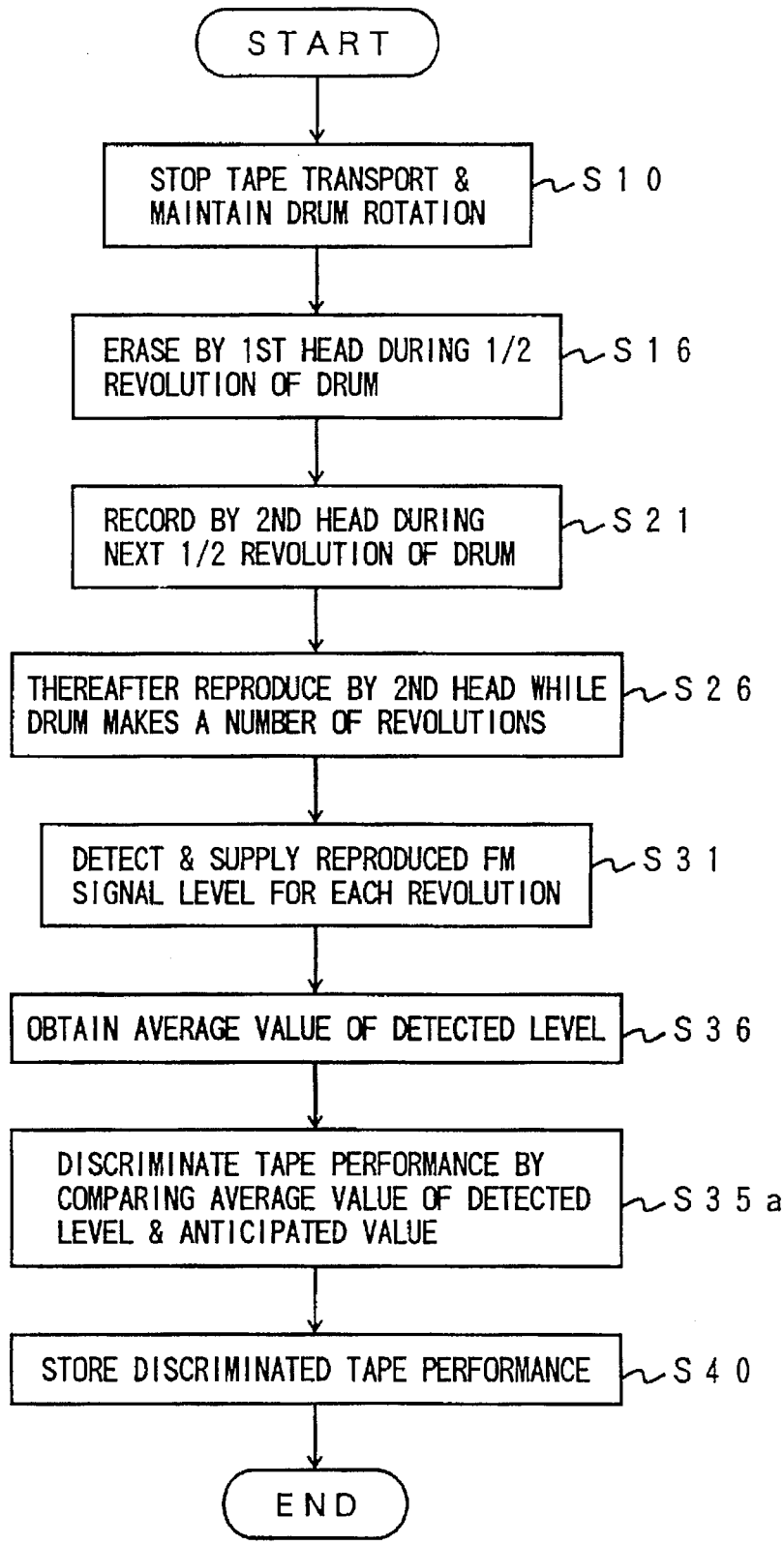
FIG. 5 is a flow chart for explaining the operation of the first embodiment.

Next, a description will be given of a first embodiment of a magnetic recording and reproducing apparatus according to the present invention by referring to FIGS. 2 through 5. FIG. 2 shows the construction of the first embodiment, and FIG. 3 shows the operation timing of the first embodiment. FIGS. 4A, 4B and 4C respectively show tape patterns related to the operation of the first embodiment, and FIG. 5 is a flow chart for explaining the operation of the first embodiment.

The magnetic recording and reproducing apparatus shown in FIG. 2 generally includes a frequency modulator 1, a recording amplifier 2, a switch 3, a rotary drum 5 having first and second magnetic heads 4a and 4b, a switch 7, a preamplifier 8, a reproduced FM detector (or frequency demodulator) 9, a microcomputer 10, a switch 12, and D.C. power supplies DC1 and DC2. A magnetic tape 6 is wrapped obliquely (helically) around an outer peripheral surface of the rotary drum 5 in a known manner. The rotary drum 5 is rotatable in a direction X.

The D.C. power supply DC2, the frequency modulator 1 and the recording amplifier 2 form an erasing means for erasing signals on a track pattern TP on the magnetic tape 6 by supplying a high-frequency current to the first magnetic head 4a which is mounted on the rotary drum 5, in a state where the magnetic tape 6 is not transported and is stationary. The signal erasure takes place by recording the D.C. signal which is frequency-modulated to a sufficiently high frequency, because such a signal will not be reproduced by the magnetic head in the frequency band of the video signal or the audio signal which is frequency-modulated and recorded on the magnetic tape 6.

The D.C. power supply DC1, the frequency modulator 1 and the recording amplifier 2 form a recording means for recording a predetermined signal on the track pattern TP which was erased by the erasing means, by the second magnetic head 4b which is mounted on the rotary drum 5. The recording means records the predetermined signal in the state where the magnetic tape 6 is stationary. The second magnetic head 4b has an azimuth angle opposite to an azimuth angle of the first magnetic head 4a.

The preamplifier 8and the reproduced FM detector 9 form a detecting means for detecting the recorded signal on the magnetic tape 8 by immediately reproducing the signal that is recorded on the magnetic tape 8 by the recording means, by the second magnetic head 4b. The detecting means detects the recorded signal in the state where the magnetic tape 6 is stationary.

The microcomputer 10 forms a discriminating means for discriminating a signal recording and reproducing characteristic of the magnetic tape 6 based on an output result obtained from the detecting means.

Although not shown in FIG. 2, preferably, a signal recording process means is provided to produce a signal that is to be recorded on recording tracks, that is, the track patterns TP, on the magnetic tape 6, and a signal reproducing process means is provided to reproduce the signal recorded on the track patterns TP of the magnetic tape 6.

When the user inputs an instruction for discriminating the performance of the magnetic tape 6 to the microcomputer 10, for example, the microcomputer 10 carries out a control to stop driving a known tape transport system (not shown) which is provided to transport the magnetic tape 6. As a result of this control, a capstan (not shown) of the tape transport system stops transporting the magnetic tape 6, while a known drum servo circuit (not shown) maintains rotation of the rotary drum 5 which is provided with the first and second magnetic heads 4a and 4b. A drum pulse signal (drum pulse, DM) which is output from the drum servo circuit is supplied to the microcomputer 10.

In this embodiment, the performance of the magnetic tape 6 corresponds to the magnetic characteristics of the magnetic tape 6 for recording signals on and reproducing signals from the magnetic tape 6.

The first and second magnetic heads 4a and 4b are located at mutually opposite positions on the rotary drum 5, and are separated by an angular interval of 108°, for example. Azimuth angles of the first and second magnetic heads 4a and 4b are mutually different, so that the signals can be recorded on and reproduced from the track patterns TP of the magnetic tape 6 corresponding to the respective magnetic heads 4a and 4b without generating crosstalk, that is, interference between two mutually adjacent track patterns TP on the magnetic tape 6.

A drum pulse signal DM shown in FIG. 3 is supplied to the microcomputer 10. For example, this drum pulse signal DM is made up of low signal portions ch1 and high signal portions ch2 which are generated by the rotation of the rotary drum 5 or based on a synchronizing signal that is included in a video signal which is input to the magnetic recording and reproducing apparatus. The microcomputer 10 controls the rotation of the rotary drum 5 in synchronism with the drum pulse signal DM, and the first and second magnetic heads 4a and 4b provided on the rotary drum 5 alternately scan the magnetic tape 6. More particularly, the microcomputer 10 controls a known driving system (not shown) including a motor which rotates the rotary drum 5. For example, the first magnetic head 4a scans the magnetic tape 6 in synchronism with the high signal portions ch2 of the drum pulse signal DM. Similarly, the second magnetic head 4b scans the magnetic tape 6 in synchronism with the low signal portions ch1 of the drum pulse signal DM.

The microcomputer 10 generates switch control signals A and C shown in FIG. 3 based on the drum pulse signal DM. The switch control signal A is supplied to the switch 12, and the switch control signal C is supplied to the switch 3. For example, when an output of the switch 12 is switched and connected to a contact c in response to the switch control signal A which is dependent on the high signal portions ch2 of the drum pulse signal DM, a voltage signal from the D.C. power supply DC2 is supplied to the frequency modulator 1.

The frequency modulator 1 modulates the voltage signal from the D.C. power supply DC2 into a high-frequency signal. The voltage signal output from the D.C. power supply DC2 is set in advance to a predetermined value so that it is possible to obtain a high-frequency signal having a sufficiently high frequency for erasing signals prerecorded on the magnetic tape 6.

The high-frequency signal output from the frequency modulator 1 is supplied to the recording amplifier 2 where the high-frequency signal is amplified with a predetermined gain. An amplified high-frequency signal output from the recording amplifier 2 is supplied to the switch 3.

For example, the switch 3 supplies the high-frequency signal which is supplied to a contact R thereof to the switch 7, as an erase signal, in response to a high-level switch control signal C from the microcomputer 10. This switch 7 supplies the signal received by the contact R thereof to the first and second magnetic heads 4a and 4b by switching in synchronism with the drum pulse signal DM. Alternatively, the switch 7 is controlled by the microcomputer 10 to supply the erase signal to only the first magnetic head 4a.

As the rotary drum 5 makes a one-half revolution, the first magnetic head 4a, for example, scans the track pattern TP on the magnetic tape 6. Hence, the erase signal described above is recorded on this track pattern TP. In other words, the prerecorded signals on the track pattern TP of the magnetic tape 6 is erased as shown in FIG. 4A.

When the rotary drum 5 further makes a one-half revolution and the low signal portion ch1 of the drum pulse signal DM is supplied to the microcomputer 10, that is, in a state where the second magnetic head 4b scans the track pattern TP, the microcomputer 10 outputs the switch control signal A described above so as to switch and connect the switch 12 to a contact b. The switch 12 supplies the voltage signal from the D.C. power supply DC1 to the frequency modulator 1 in response to the switch control signal.

The voltage signal from the D.C. power supply DC1 is set to a predetermined reference value. The frequency modulator 1 frequency-modulates this voltage signal from the D.C. power supply DC1, and the modulated voltage signal is supplied to the contact R of the switch 3 via the recording amplifier 2. In this state, the microcomputer 10 maintains the state of the switch control signal C to the high level, so that the signal supplied to the contact R of the switch 3 is supplied to the switch 7. The switch 7 supplies the signal from the switch 3 to the second magnetic head 4b in this case, as the recording signal.

As a result, in the state where the second magnetic head 4b scans the magnetic tape 6, a predetermined recording signal which is set by the D.C. power supply DC1 is recorded on the track pattern TP of the magnetic tape 6 as shown in FIG. 4B.

Then, when the rotary drum 5 further makes a one-half revolution, the signal portion ch2 of the drum pulse signal DM is supplied to the microcomputer 10, that is, in the state where the first magnetic head 4a scans the track pattern TP on the magnetic tape 6, the microcomputer 10 outputs the switch control signal A so that the switch 12 is switched and connected to a contact a. The switch 12 outputs a luminance signal which is supplied from a transmission path (not shown), for example, in response to this switch control signal A.

At the same time, the microcomputer 10 changes the state of the switch control signal C to the low level, so that the switch 7 switches and outputs the signal supplied to a contact P thereof. In this state, since the magnetic tape 6 remains stationary, the first magnetic head 4a scans the track pattern TP of the magnetic tape 6.

As described above, this track pattern TP is recorded with the recording signal by the second magnetic head 4b. But because the azimuth angles of the first and second magnetic heads 4a and 4b are mutually different as may be seen from FIGS. 4A and 4B, the first magnetic head 4a does not reproduce the signal which has been recorded by the second magnetic head 4b. In other words, the recording signal which has been recorded on the track pattern TP of the magnetic tape 6 by the second magnetic head 4b can only be reproduced from the track pattern TP when this track pattern TP is scanned by the second magnetic head 4b having the same azimuth angle as the magnetic head which recorded the recording signal. The "azimuth angle" of the magnetic head is also referred to as the angle of a gap G of the magnetic head.

When the rotary drum 5 further makes a one-half revolution and the signal portion ch1 of the drum pulse signal DM is supplied to the microcomputer 10, that is, in the state where the second magnetic head 4b scans the track pattern TP on the magnetic tape 6, the microcomputer 10 outputs the switch control signal A to maintain the switch 12 in the state connected to the contact a and also outputs the switch control signal C which is maintained to the low level. As a result, the second magnetic head 4b scans the track pattern TP of the magnetic tape 6 as shown in FIG. 4C.

Accordingly, the second magnetic head 4b reproduces the recorded signal from the track pattern TP of the magnetic tape 6 and obtains a reproduced FM signal. This reproduced FM signal is supplied to the preamplifier 8 via the contact P of the switch 3. The preamplifier 8 amplifies the reproduced FM signal to a predetermined level and supplies the amplified signal to the reproduced FM detector 9.

The reproduced FM detector 9 integrates the reproduced FM signal and converts it into a D.C. voltage signal. This D.C. voltage signal is supplied to the microcomputer 10. This D.C. voltage signal has a value proportional to the level of the reproduced FM signal. The memory 11 of the microcomputer 10 prestores anticipated values of the D.C. voltage signals which are obtained from ideal reproduced FM signals depending on the kinds of magnetic tape, for example. For this reason, the microcomputer 10 can discriminate the performance of the magnetic tape 6 by comparing the value of the D.C. voltage signal that is received from the reproduced FM detector 9 and the anticipated values prestored in the memory 11.

The performance of the magnetic tape 6 can be discriminated by the microcomputer 10 during a time in which the rotary drum 5 makes two revolutions. For example, if the magnetic recording and reproducing apparatus is a VTR for home use and the rotary drum 5 rotates at a speed of 30 revolutions per second, the time required to discriminate the performance of the magnetic tape 6 is 2/30 second, that is, approximately 0.067 second.

Of course, the performance of the magnetic tape 6 can be discriminated during a time other than the time in which the rotary drum 5 makes two revolutions. For example, in order to stably obtain the reproduced FM signal, it is possible to rotate the rotary drum 5 to undergo a predetermined number of revolutions and to store the D.C. voltage signal which is obtained for each revolution of the rotary drum 5 into the memory 11. In this case, the performance of the magnetic tape 6 can be discriminated based on an average value of the D.C. voltage signals stored in the memory 11. It is also possible in this case to carry out the signal erasure, the recording of the recording signal and the reproduction of the recording signal described above with respect to the track pattern TP on the magnetic tape 6 during the time in which the rotary drum 5 make two revolutions. Hence, even if the rotary drum 5 is rotated to undergo 10 revolutions, for example, it is possible to discriminate the performance of the magnetic tape 6 in 10/30 second, that is, approximately 0.333 second.

For example, the magnetic characteristics and the like which are dependent on the performance of the magnetic tape 6 are stored in the memory 11 together with the anticipated values of the D.C. voltage signals, and are set with respect to the microcomputer 10. Hence, the microcomputer 10 can use the magnetic characteristics and the like stored in the memory 11 to control the signal recording process and the signal reproducing process of the magnetic recording and reproducing apparatus depending on the discriminated performance of the magnetic tape 6.

The flow chart shown in FIG. 5 corresponds to the operation of the microcomputer 10 shown in FIG. 2. In FIG. 5, those steps which are the same as those corresponding steps in FIG. 1 are designated by the same reference numerals, and a description thereof will be omitted.

In FIG. 5, a step S16 controls the switches 12 and 3 so that the first magnetic head 4a erases the prerecorded signals on the track pattern TP of the magnetic tape 6 while the rotary drum 5 makes a one-half revolution. A step S21 then controls the switches 12 and 3 so that the second magnetic head 4b records the recording signal on the track pattern TP of the magnetic tape 6 while the rotary drum 5 further makes a one-half revolution. A step S26 thereafter controls the switches 12 and 3 so that the second magnetic head 4b reproduces the recording signal from the track pattern TP of the magnetic tape 6 while the rotary drum 5 makes a predetermined number of revolutions.

As the rotary drum 5 makes the predetermined number of revolutions, a step S31 detects the level of the reproduced FM signal that is reproduced from the track pattern TP of the magnetic tape 6 by the second magnetic head 4b for each revolution of the rotary drum 5. Each detected level of the reproduced FM signal is stored in the memory 11. Next, a step S36 obtains an average value of the detected levels of the reproduced FM signals stored in the memory 11. A step S35a discriminates the performance of the magnetic tape 6 by comparing the average value of the detected levels of the reproduced FM signals and the anticipated values which are prestored in the memory 11. Then, the step S40 stores the discriminated performance of the magnetic tape 6 in the memory 11, and the process ends.

Figure 6:
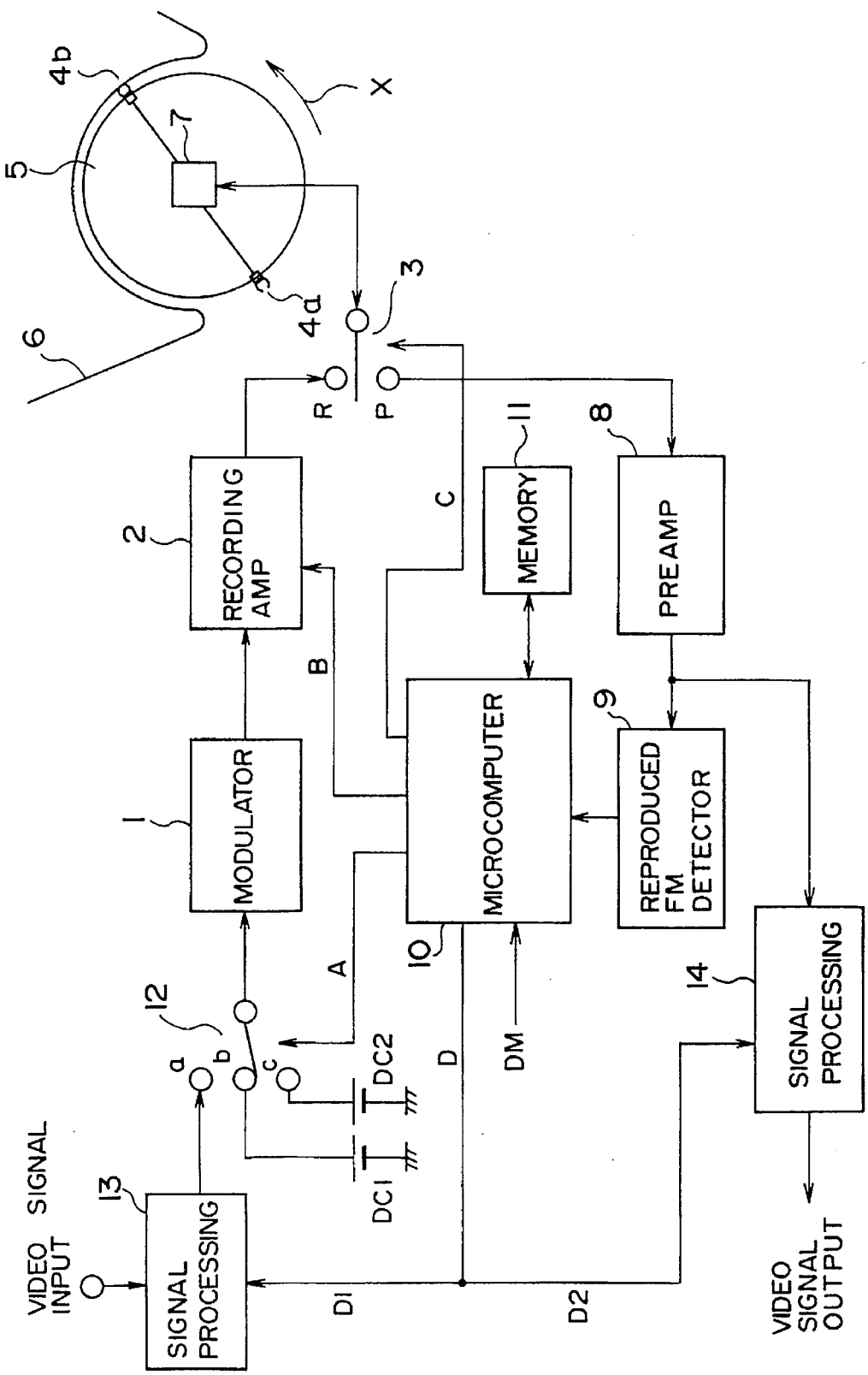
FIG. 6 is a system block diagram showing a second embodiment of the magnetic recording and reproducing apparatus according to the present invention.

Next, a description will be given of a second embodiment of the magnetic recording and reproducing apparatus according to the present invention, by referring to FIGS. 6 through 8. FIG. 6 shows the construction of the second embodiment, and FIGS. 7 and 8 respectively are flow charts for explaining the operation of the second embodiment. In FIG. 6, those parts which are the same as those corresponding parts in FIG. 2 are designated by the same reference numerals, and a description thereof will be omitted.

The magnetic recording and reproducing apparatus shown in FIG. 6 includes a signal processing circuit 13 of the recording system, and a signal processing circuit 14 of the reproducing system, in addition to those elements of the magnetic recording and reproducing apparatus shown in FIG. 2. The signal processing circuit 13 forms a recording signal process means, and carries out a known signal processing in the VTR for home use with respect to a video signal and an audio signal supplied from a transmission path (not shown) so as to record the video and audio signals on the magnetic tape 6. On the other hand, the signal processing circuit 14 forms a reproducing signal process means, and carries out a known signal processing with respect to the signals reproduced from the magnetic tape 6. The signal processing carried out in the signal processing circuit 14 is complementary to the signal processing carried out in the signal processing circuit 13, and demodulates the signals reproduced from the magnetic tape 6 so as to obtain the video and audio signals. For the sake of convenience, a description will only be given with respect to a video signal processing, however, an audio signal processing dependent on the video signal processing is carried out with respect to the audio signal.

The D.C. power supply DC2, the frequency modulator i and the recording amplifier 2 form an erasing means for erasing signals on a track pattern TP on the magnetic tape 6 by supplying a high-frequency current to the first magnetic head 4a which is mounted on the rotary drum 5, in a state where the magnetic tape 6 is not transported and is stationary. The D.C. power supply DC2 may be regarded as an erase signal generator.

The D.C. power supply DC1, the frequency modulator i and the recording amplifier 2 form a recording means for recording a predetermined signal on the track pattern TP which was erased by the erasing means, by the second magnetic head 4b which is mounted on the rotary drum 5. This predetermined signal is set with a plurality of gains. The D.C. power supply DC1 may be regarded as a recording signal generator.

The preamplifier 8 and the reproduced FM detector 9 form a detecting means for detecting the recorded signal on the magnetic tape 6 having a maximum level by immediately reproducing the signal that is recorded on the magnetic tape 6 by the recording means, by the second magnetic head 4b.

The microcomputer 10 discriminates a signal recording and reproducing characteristic of the magnetic tape 6 based on an output result obtained from the detecting means. In addition, based on the discriminated signal recording and reproducing characteristic of the magnetic tape 6, the microcomputer 10 controls the signal processing circuit 13 during a recording mode, and controls the signal processing circuit 14 during a reproducing mode. In other words, the microcomputer 10 forms a control means for discriminating the signal recording and reproducing characteristic of the magnetic tape 6 and controlling the signal processing circuits 13 and 14 based on the discrimination result.

When the user inputs an instruction for putting the magnetic recording and reproducing apparatus into the recording mode or the reproducing mode, the microcomputer 10 carries out a control to record the video signal on or to reproduce the video signal from the magnetic tape 6.

Hence, when the user instructs recording of the video signal from an input means (not shown), this instruction is supplied to the microcomputer 10 and the microcomputer 10 switches the operation mode of the magnetic recording and reproducing apparatus to a normal recording mode. For example, the input means is an operation panel of the magnetic recording and reproducing apparatus.

In the normal recording mode, the microcomputer 10 first carries out the steps S10 through S40 shown in FIG. 1. Hence, the reproduced FM signal is obtained as described above for the first embodiment by reproducing the recorded signal on the magnetic tape 6. The reproduced FM signal is converted into the D.C. voltage signal via the preamplifier 8 and the reproduced FM detector 9, and this D.C. voltage signal is supplied to the microcomputer 10. The microcomputer 10 compares this D.C. voltage signal and the anticipated values stored in the memory 11, so as to discriminate the performance of the magnetic tape 6. The discriminated performance of the magnetic tape 6, that is, the discrimination result, is stored in the memory 11.

The microcomputer 10 reads the discriminated performance of the magnetic tape 6 that is stored in the memory 11, and supplies a recording control signal D1 which is based on the performance of the magnetic tape 6 to the signal processing circuit 13. In addition, the microcomputer 10 also supplies the switch control signal A to the switch 12, the switch control signal C to the switch 3, and a gain control signal B to the recording amplifier 2.

For example, the recording control signal D1 includes information indicative of the control quantities related to the recording level control, the gain control, the emphasis control and the like for always recording an optimum signal depending on the discriminated performance of the magnetic tape 6. The memory 11 of the microcomputer 10 prestores the control quantities of the signal processing circuit 13 depending on the performance of the magnetic tape 6.

When the recording control signal D1 output from the microcomputer 10 is supplied to the signal processing circuit 13, the signal processing circuit 13 carries out the recording level control, the gain control, the emphasis control and the like with respect to the video and audio signals which are received from the transmission path (not shown) depending on the recording control signal D1.

The video signal output from the signal processing circuit 13 is supplied to the switch 12, and the switch 12 supplies this video signal to the frequency modulator 1 in response to the switch control signal A. The FM signal output from the frequency modulator 1 is supplied to the recording amplifier 2 and is amplified to a recording level which is dependent on the recording control signal D1 in response to the gain control signal B. The amplified FM signal is supplied to the contact R of the switch 3. The switch 3 supplies the amplified FM signal to the first and second magnetic heads 4a and 4b via the switch 7 in response to the switch control signal C.

The first and second magnetic head 4a and 4b alternately record the FM signal, that is, the video signal, on the track patterns TP of the magnetic tape according to a predetermined recording operation. As a result, it is possible to record the video signal on the magnetic tape 6 based on the performance of the magnetic tape 6 that is discriminated by the microcomputer 10. For this reason, it is possible to always record on the magnetic tape 6 the video signal which has been subjected to a recording signal processing which is dependent on the performance of the magnetic tape 6.

Next, a description will be given of a normal reproducing mode of this embodiment which reproduces the video signal which is recorded on the magnetic tape 6 as described above.

When the user instructs reproduction of the video signal from the input means (not shown), this instruction is supplied to the microcomputer 10 and the microcomputer switches the operation mode of the magnetic recording and reproducing apparatus to the normal reproducing mode. In the normal reproducing mode, the microcomputer 10 controls the tape transport system (not shown) to transport the magnetic tape 6 and controls the driving system (not shown) to rotate the rotary drum 5. Hence, the first and second magnetic heads 4a and 4b alternately scan the magnetic tape 6 and the signal reproduced from the magnetic tape 6 is supplied to the contact P of the switch 3 via the switch 7.

Furthermore, the microcomputer 10 also outputs the switch control signal C and a reproduction control signal D2 which will be described later. The switch control signal C switches and connects the switch 3 to the contact P.

The reproduced signal output from the switch 3 is supplied to the preamplifier 8 wherein the reproduced signal is amplified by a predetermined quantity. The amplified reproduced signal from the preamplifier 8 is supplied to the signal processing circuit 14 and the reproduced FM detector 9. The reproduced signal supplied to the reproduced FM detector 9 is integrated into the D.C. voltage signal as described above, and this D.C. voltage signal is supplied to the microcomputer 10. The microcomputer 10 compares this D.C. voltage signal and the anticipated values which are prestored in the memory 11, so as to discriminate the performance of the magnetic tape 6. The microcomputer 10 outputs the reproduction control signal D2 based on the discriminated performance of the magnetic tape 6, and supplies the production control signal D2 to the signal processing circuit 14.

For example, the reproduction control signal D2 includes information indicative of the de-emphasis control, the reproduction equalizing control and the like for always reproducing the signal from the magnetic tape 6 with an optimum characteristic depending on the discriminated performance of the magnetic tape 6. The memory 11 of the microcomputer 10 prestores the control quantities of the signal processing circuit 14 depending on the performance of the magnetic tape 6.

The signal processing circuit 14 frequency-demodulates the reproduced signal which is obtained via the preamplifier 8 based on the reproduction control signal D2 which is supplied from the microcomputer 10. The signal processing circuit 14 also subjects the demodulated signal to the de-emphasis control, the reproduction equalizing control and the like based on the reproduction control signal D2, to thereby obtain a reproduced video signal. This reproduced video signal is output to the transmission path (not shown) which may be a display device such as a monitor.

Because the video signal can be reproduced based on the performance of the magnetic tape 6 which is discriminated by the microcomputer 10, it is always possible to reproduce the video signal which was recorded on the magnetic tape 6 depending on the performance of the magnetic tape 6 by a reproducing process which is dependent on the performance of the magnetic tape 6.

Figure 7:
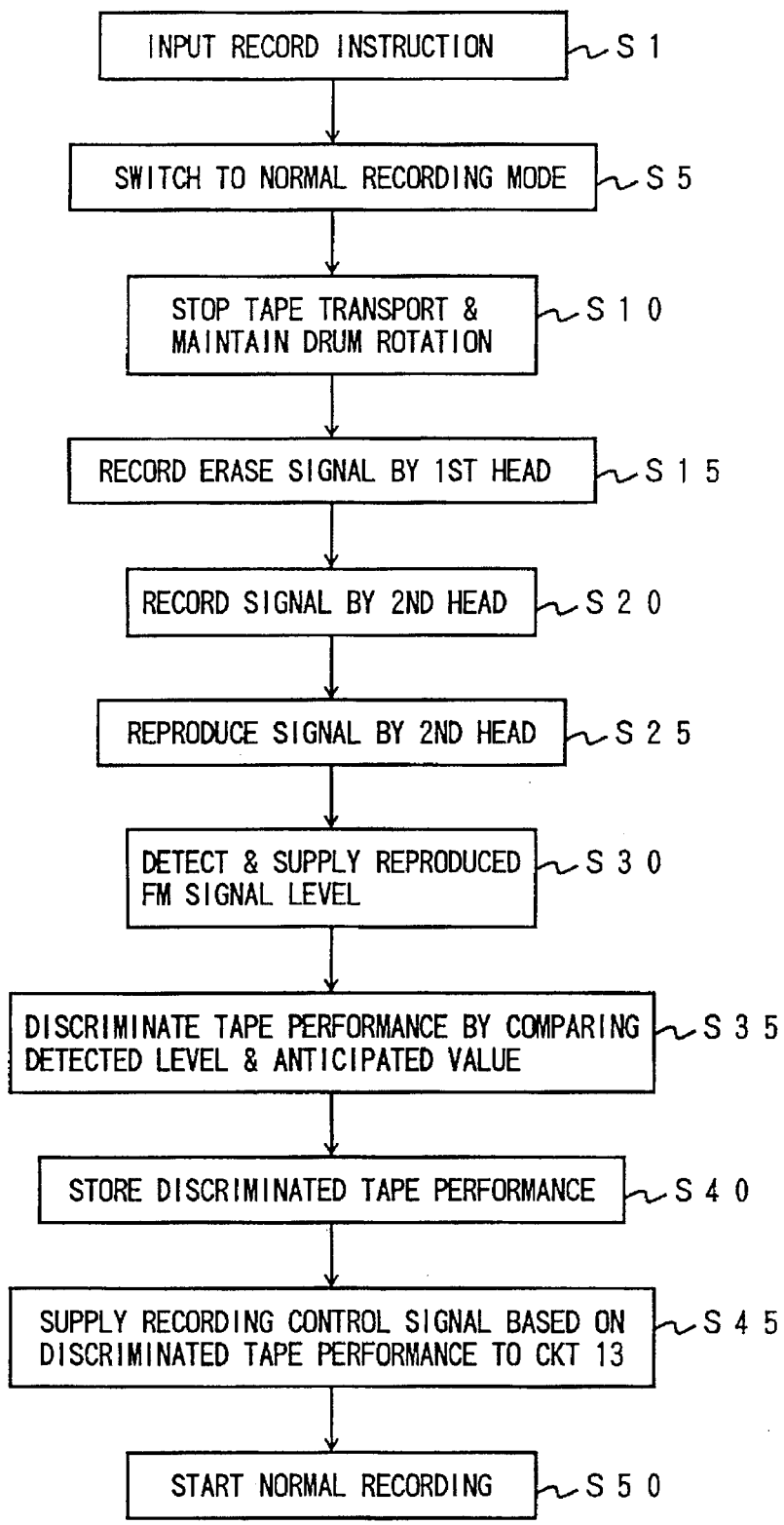
FIG. 7 is a flow chart for explaining a normal recording process of the second embodiment.

The flow chart shown in FIG. 7 corresponds to the operation of the microcomputer 10 shown in FIG. 6 in the normal recording mode. In FIG. 7, those steps which are the same as those corresponding steps in FIG. 1 are designated by the same reference numerals, and a description thereof will be omitted.

In FIG. 7, a step S1 inputs the record instruction which is input by the user from the input means. A step S5 switches the operation mode of the magnetic recording and reproducing apparatus to the normal recording mode. Then, the steps S10 through S40 are carried out. After the step S40, a step S45 generates the recording control signal D1 based on the discriminated performance of the magnetic tape 6, and supplies this recording control signal D1 to the signal processing circuit 13 of the recording system. A step S50 starts the normal recording operation.

Figure 8:
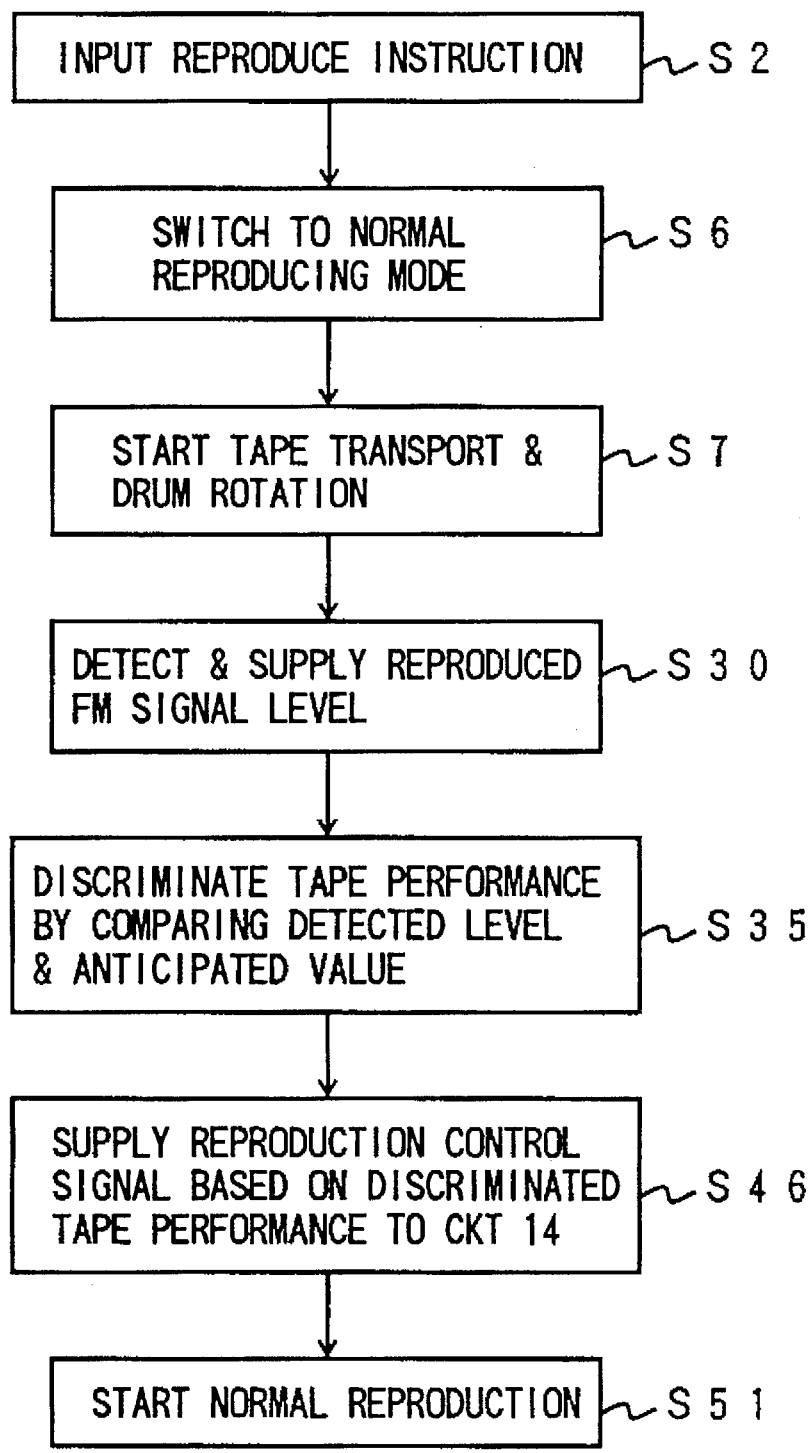
FIG. 8 is a flow chart for explaining a normal reproducing process of the second embodiment.

The flow chart shown in FIG. 8 corresponds to the operation of the microcomputer 10 shown in FIG. 6 in the normal reproducing mode. In FIG. 8, those steps which are the same as those corresponding steps in FIG. 1 are designated by the same reference numerals, and a description thereof will be omitted.

In FIG. 8, a step S2 inputs the reproduction instruction signal which is input by the user from the input means. A step S6 switches the operation mode of the magnetic recording and reproducing apparatus to the normal reproducing mode. A step S7 starts driving the tape transport system to transport the magnetic tape 6, and also starts the driving system to rotate the rotary drum 5. The steps S30 and S35 are then carried out. After the step S35, a step S46 generates the reproduction control signal D2 based on the discriminated performance of the magnetic tape 6, and supplies this reproduction control signal D2 to the signal processing circuit 14 of the reproducing system. A step S51 starts the normal reproducing operation.

Figure 9:
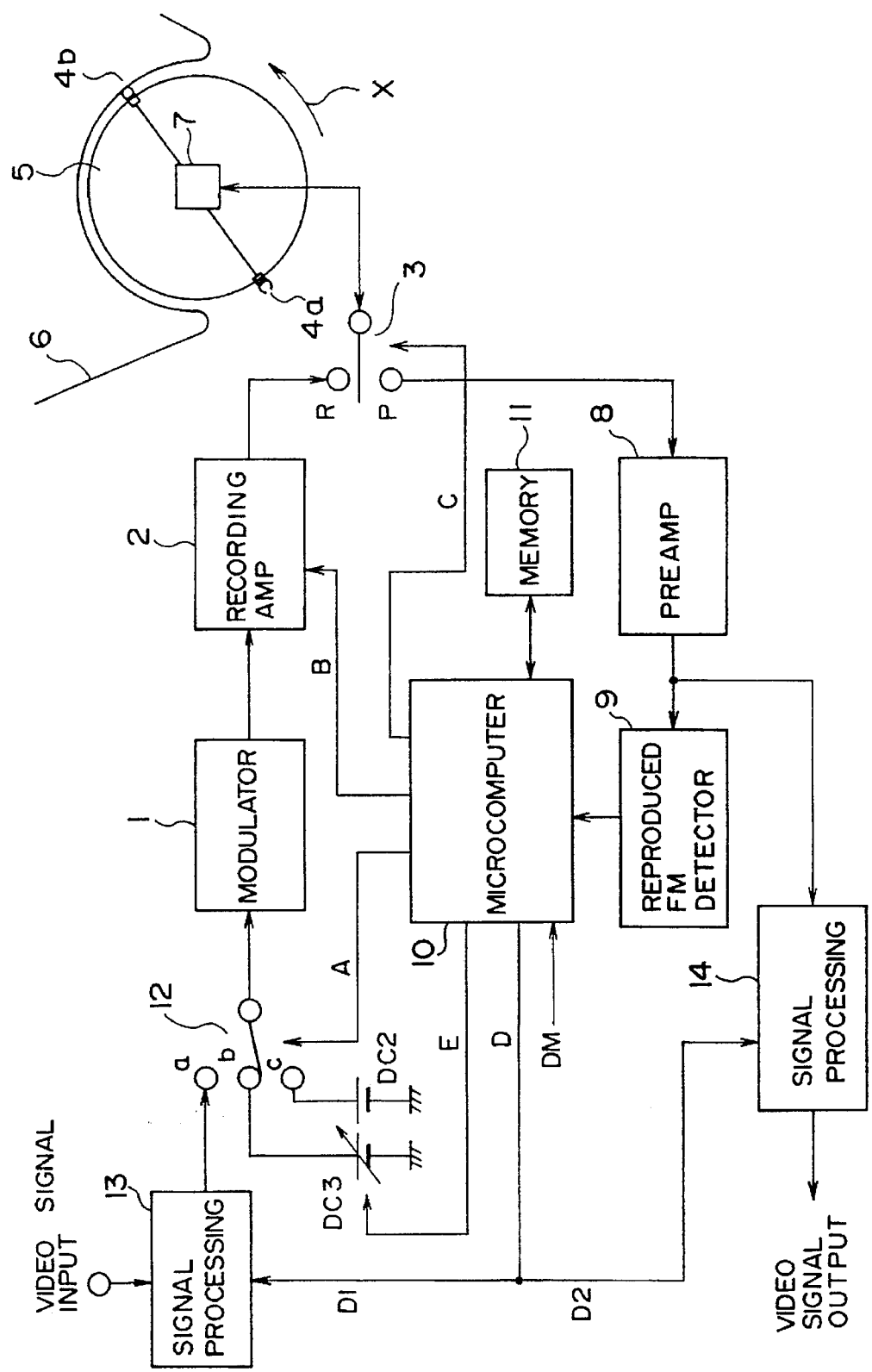
FIG. 9 is a system block diagram showing a third embodiment of the magnetic recording and reproducing apparatus according to the present invention.
Figure 10:
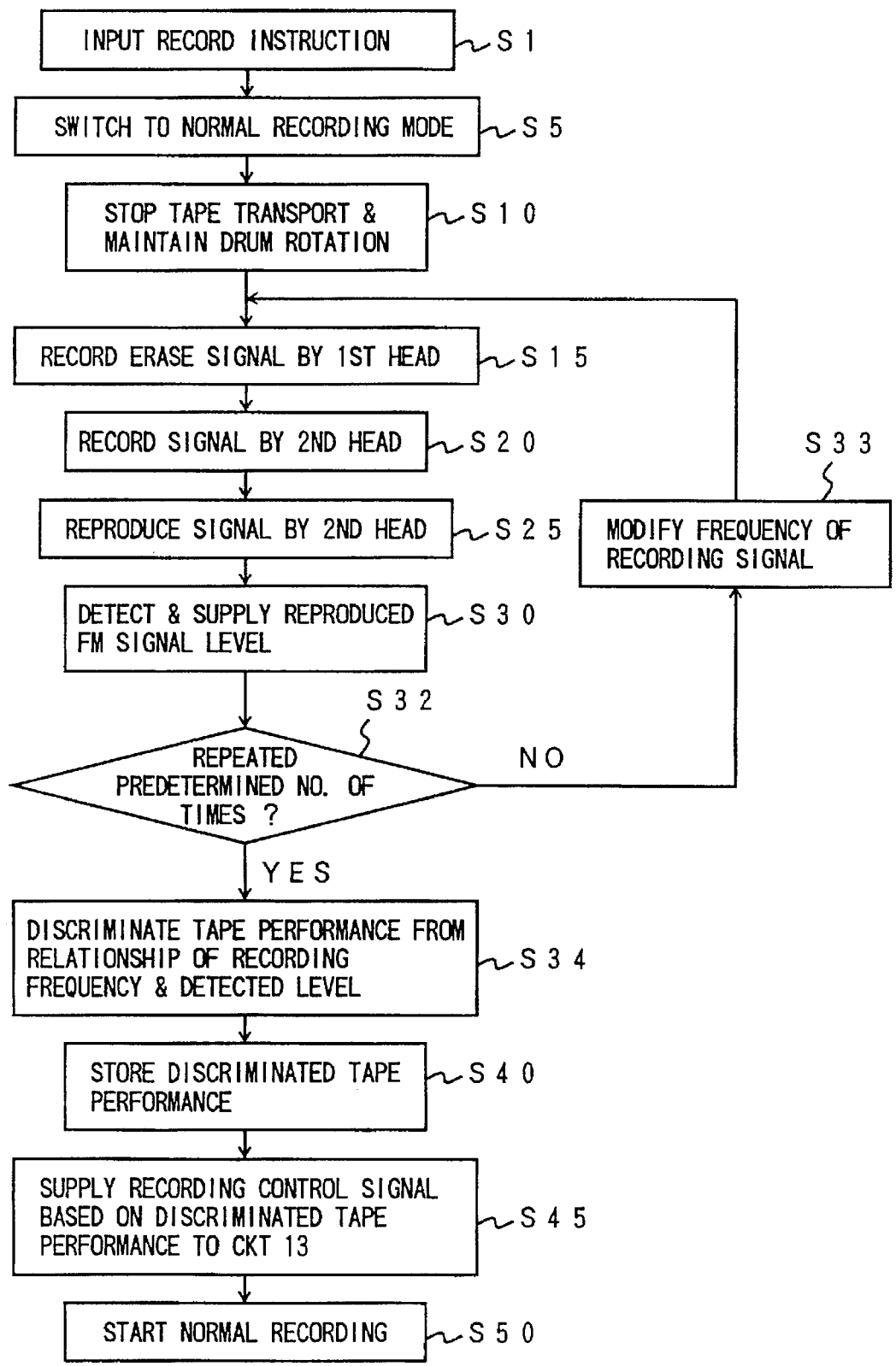
FIG. 10 is a flow chart for explaining the operation of the third embodiment.
Figure 11:
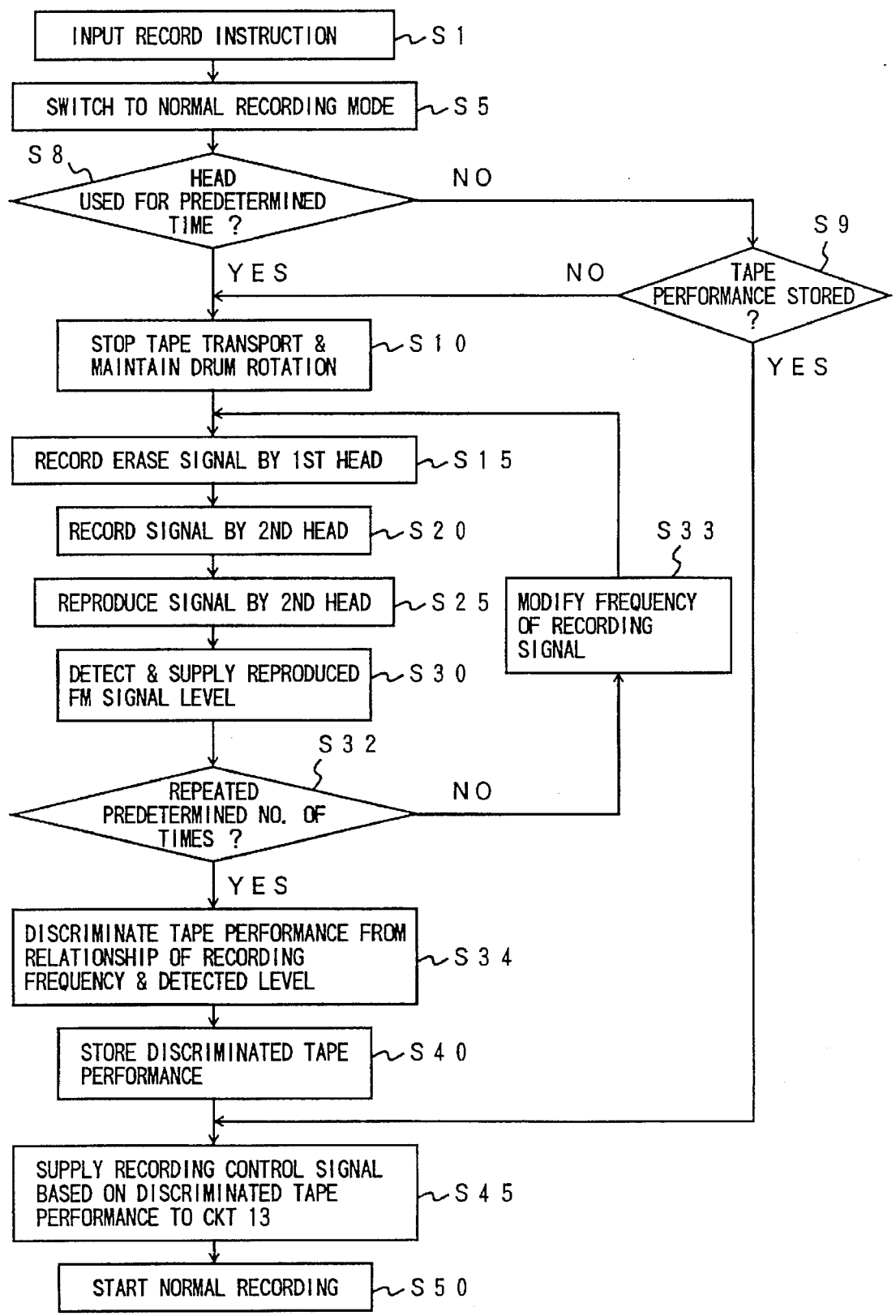
FIG. 11 is a flow chart for explaining the operation of a modification of the third embodiment.
Figure 12:
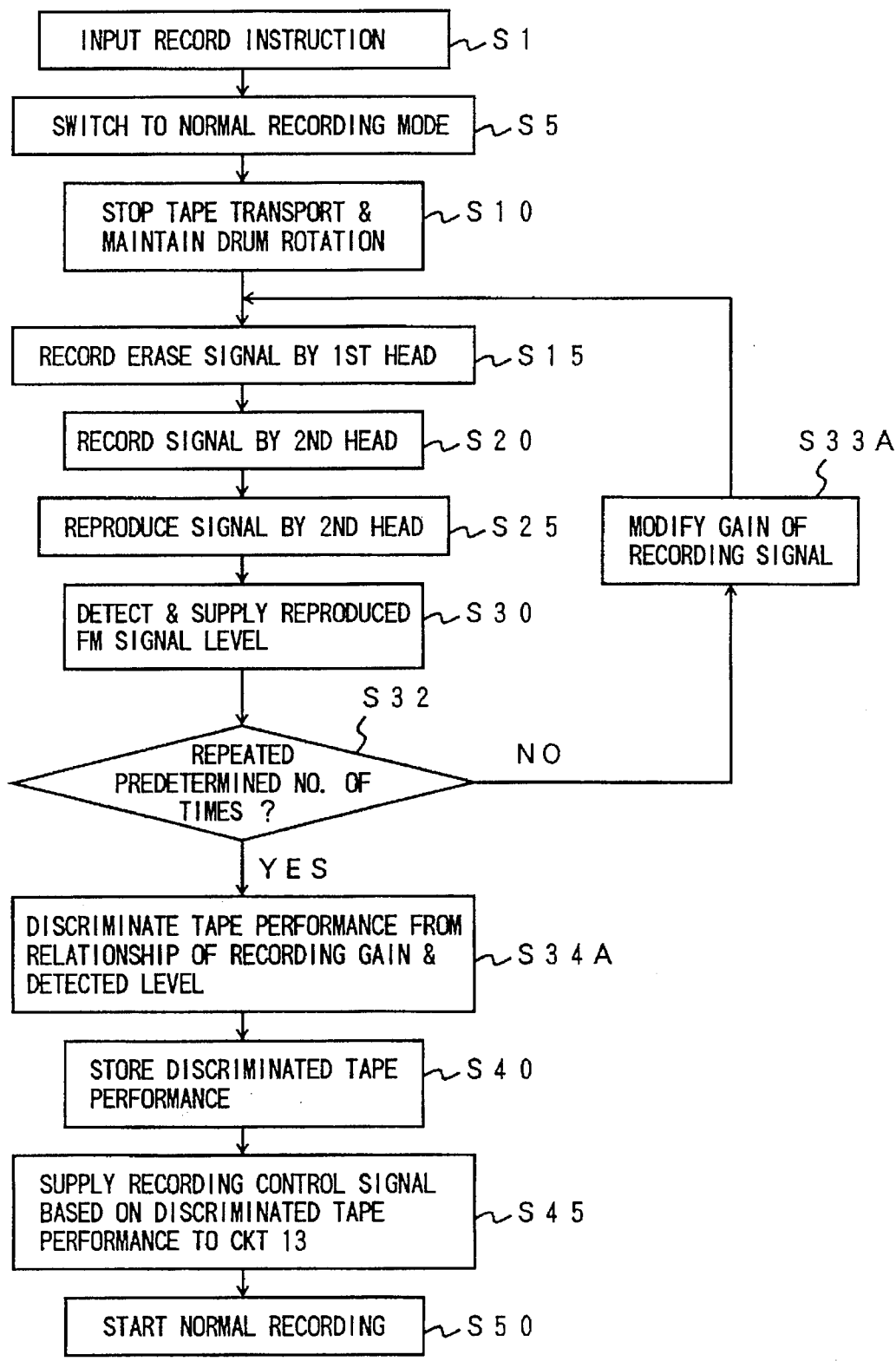
FIG. 12 is a flow chart for explaining the operation of a modification of the second embodiment.
Figure 13:
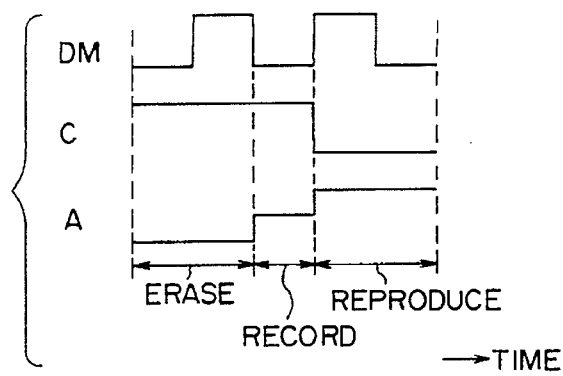
FIG. 13 is a timing chart for explaining the operation of a modification of the first embodiment.

Next, a description will be given of a third embodiment of the magnetic recording and reproducing apparatus according to the present invention, by referring to FIGS. 9 through 13. FIG. 9 shows the construction of the third embodiment, and FIGS. 10 through 12 are flow charts for explaining the operation of the third embodiment. FIG. 13 is a timing chart for explaining the operation of the third embodiment. In FIG. 9, those parts which are the same as those corresponding parts in FIG. 6 are designated by the same reference numerals, and a description thereof will be omitted. This third embodiment can make a more detailed discrimination of the performance of the magnetic tape 6 as compared to the second embodiment described above.

The magnetic recording and reproducing apparatus shown in FIG. 9 uses a variable D.C. power supply DC3 in place of the D.C. power supply DC1 used in the second embodiment. In the second embodiment, the D.C. power supply DC1 determines the frequency of the recording signal which is recorded on the magnetic tape 6 for the purpose of discriminating the performance of the magnetic tape 6. Hence, by using the variable D.C. power supply DC3 in place of the D.C. power supply D1, it is possible to vary the frequency of the recording signal.

For example, when each of the recording signals having the varied frequency are reproduced from the magnetic tape 6 and are supplied to the microcomputer 10, the microcomputer 10 can obtain the frequency of the recording signal for which a maximum reproduced signal level is obtained. Hence, the microcomputer 10 can discriminate the performance of the magnetic tape 6 based on the frequency of the recording signal for which the maximum reproduced signal level is obtained.

When the user instructs recording of the video signal from the input means (not shown), this instruction is supplied to the microcomputer 10 and the microcomputer 10 switches the operation mode of the magnetic recording and reproducing apparatus to a normal recording mode. In this normal recording mode, a voltage signal output from the variable D.C. power supply DC3 is passed through the frequency modulator 1 and the recording amplifier 2 and is supplied to the contact R of the switch 3 as the erase signal. After the recorded signals on the track pattern TP of the magnetic tape 6 are erased by the erase signal, the microcomputer 10 supplies the switch control signal C to the switch 3 so that the switch 3 outputs the voltage signal from the variable D.C. power supply DC3, similarly as in the case of the second embodiment described above.

In this state, the microcomputer 10 outputs a level control signal E so as to vary the level of the voltage signal which is output from the variable D.C. power supply DC3. A recording signal which is obtained based on the voltage signal from the variable D.C. power supply DC3 is recorded on the track pattern TP of the magnetic tape 6, and a reproduced signal is obtained by reproducing the recording signal from the track pattern TP. This reproduced signal is supplied to the microcomputer 10 via the preamplifier 8 and the reproduced FM detector 9. The microcomputer 10 converts the reproduced signal into the D.C. voltage signal and stores this D.C. voltage signal in the memory 11, for example.

Next, the microcomputer 10 supplies the switch control signal A to the switch 12 and the switch control signal C to the switch 3, so as to again supply the erase signal to the first and second magnetic heads 4a and 4b. In addition, the microcomputer 10 supplies the level control signal E to the variable D.C. power supply DC3 so as to vary the level of the voltage signal output from the variable D.C. power supply DC3.

Thereafter, the signal erasure on the track pattern TP, the frequency modification of the recording signal, the recording of the recording signal having the modified frequency, and the reproduction of the recorded signal are repeated a predetermined number of times, for example. In this case, the voltage values of the voltage signal that is output from the variable D.C. power supply DC3 depending on the frequency of the recording signal which is modified by the microcomputer 10 are set in advance within the microcomputer 10 or are prestored in the memory 11.

The microcomputer 10 obtains the frequency of the recording signal with which the maximum output is obtained based on the D.C. voltage signal that is obtained by converting the reproduced signal. For example, it is possible to discriminate the magnetic characteristics of the magnetic tape 6 based on this frequency of the recording signal. In other words, because it is-possible to discriminate the performance of the magnetic tape 6, the signal processing circuit 13 can be controlled similarly to the second embodiment described above depending on the performance of the magnetic tape 6 that is discriminated by the microcomputer 10.

The flow chart shown in FIG. 10 corresponds to the operation of the microcomputer 10 shown in FIG. 9. In FIG. 10, those steps which are the same as those corresponding steps in FIG. 7 are designated by the same reference numerals, and a description thereof will be omitted.

In FIG. 10, a step S32 decides whether or not the signal erasure on the track pattern TP, the frequency modification of the recording signal, the recording of the recording signal having the modified frequency, and the reproduction of the recorded signal are repeated a predetermined number of times. If the decision result in the step S32 is NO, a step S33 modifies the frequency of the recording signal, and the process returns to the step S15. On the other hand, if the decision result in the step S32 is YES, a step S34 discriminates the performance of the magnetic tape 6 based on the relationship of the frequency of the recorded signal and the detected level of the reproduced FM signal. The process advances to the step S40 after the step S34.

The wear of the magnetic heads 4a and 4b due to friction progresses with time, that is, the time for which the magnetic heads 4a and 4b are used, and the characteristics of the magnetic heads 4a and 4b change due to this frictional wear. However, since the performance of the magnetic tape 6 is discriminated when making the normal recording in the normal recording mode and when making the normal reproduction in the normal reproducing mode, it is possible to control the signal processing circuits 13 and 14 depending on the discriminated performance of the magnetic tape 6 even when the characteristics of the magnetic heads 4a and 4b change due to the frictional wear.

For example, in a modification of the third embodiment, the discriminated performance of the magnetic tape 6 may be stored in the memory 11. In this case, the stored performance of the magnetic tape 6 may be read from the memory 11 and used for a predetermined time until the characteristics of the magnetic heads 4a and 4b change due to the frictional wear. In other words, it is possible to use the performance of the magnetic tape 6 which has been discriminated before depending on the stage or degree of the frictional wear of the magnetic tape 6. The time for which the magnetic heads 4a and 4b are used may be measured intermittently by the microcomputer 10 and stored in the memory 11 or another memory (not shown). In this case, the microcomputer 10 can discriminate the performance of the magnetic tape 6 by judging whether or not to update the discriminated performance stored in the memory 11 depending on the stored time which indicates the stage or degree of the frictional wear of the magnetic heads 4a and 4b.

FIG. 11 is a flow chart for explaining the operation of this modification of the third embodiment. In FIG. 11, those steps which are the same as those corresponding steps in FIG. 10 are designated by the same reference numerals, and a description thereof will be omitted.

In FIG. 11, steps S8 and S9 are provided in addition to those steps shown in FIG. 10. After the step S5, a step S8 decides whether or not the time for which the magnetic heads 4a and 4b are used exceeds a predetermined time. If the decision result in the step S8 is YES, the process advances to the step S10. On the other hand, if the decision result in the step S8 is NO, a step S9 decides whether or not the discriminated performance of the magnetic tape 6 is stored in the memory 11, for example. The process advances to the step S10 if the decision result in the step S9 is NO. But if the decision result in the step S9 is YES, the process advances to the step S45.

In the first and second embodiments described above, it is of course possible to change the gain of the recording amplifier 2 based on the gain control signal B depending on the drum pulse signal DM which is supplied to the microcomputer 10. For example, when a control is carried out to gradually increase the gain of the recording amplifier 2 for every 1 cycle (1 period) of the drum pulse signal DM, it becomes possible to change the characteristic of the recording signal without the use of the variable D.C. power supply DC3. In this case, the performance of the magnetic tape 6 can be discriminated by reproducing the recorded recording signal from the magnetic tape 6.

FIG. 12 is a flow chart for explaining a modification of the second embodiment in which the gain of the recording amplifier 2 is changed based on the gain control signal B depending on the drum pulse signal DM which is supplied to the microcomputer 10. In FIG. 12, those steps which are the same as those corresponding steps in FIG. 10 are designated by the same reference numerals, and a description thereof will be omitted.

In FIG. 12, steps S33A and 34A are respectively provided in place of the steps S33 and S34 shown in FIG. 10. The step S33A modifies the gain of the recording signal. On the other hand, the step S34A discriminates the performance of the magnetic tape 6 based on the relationship of the gain of the recorded signal and the detected level of the reproduced FM signal.

In the recording amplifier 2, it is possible to make the erase signal oscillate instead of making the bias oscillation. This can be achieved by applying a recording amplifier which makes the bias oscillation and is used in an audio circuit or the like to the recording amplifier 2.

When discriminating the performance of the magnetic tape 6, the erasure of the signals prerecorded on the magnetic tape 6, the recording of the signal on the magnetic tape 6, and the reproduction of the recorded signal from the magnetic tape 6 can be carried out at timings different from those described above. For example, the timings shown in FIGS. 13, 15 or 16 may be employed. Each of FIGS. 13, 15 and 16 shows the drum pulse signal DM, and the switch control signals C and A.

In a modification of the first embodiment shown in FIG. 13, the control of the erasure, recording and reproduction depending on the drum pulse signal DM is changed, so that the first magnetic head 4a, for example, which erases the prerecorded signals on the magnetic tape 6 is used to record the recording signal on the magnetic tape 6 and to reproduce the recording signal from the magnetic tape 6.

Figure 14:
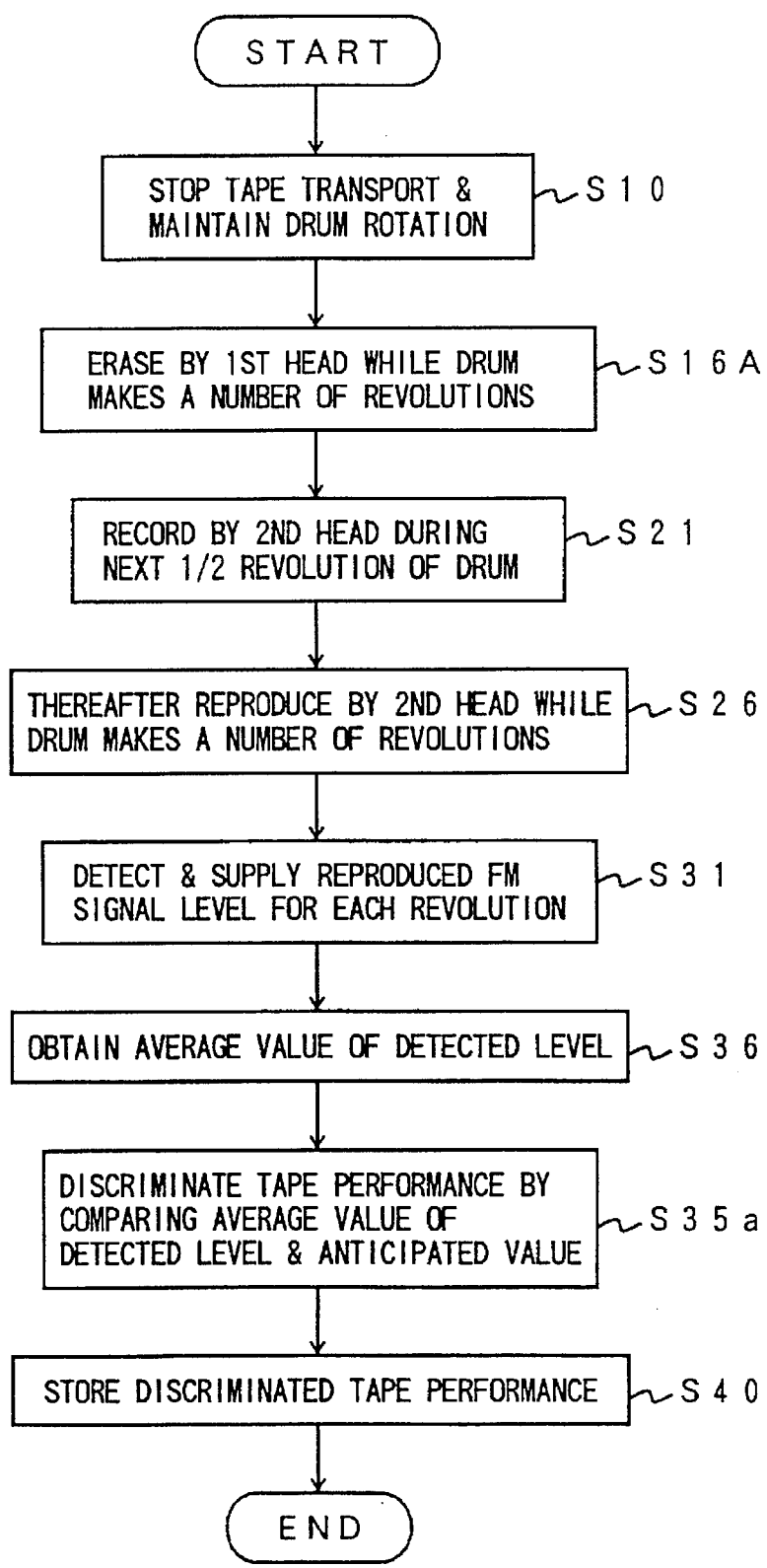
FIG. 14 is a flow chart for explaining the operation of modification of the first embodiment.

FIG. 14 is a flow chart for explaining the operation of this modification of the first embodiment. In FIG. 14, those steps which are the same as those corresponding steps in FIG. 5 are designated by the same reference numerals, and a description thereof will be omitted.

Figure 15:
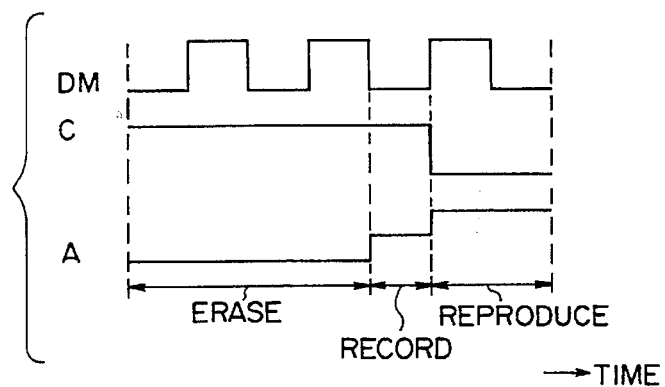
FIGS. 15 and 16 respectively are timing charts for explaining the operations of further modifications of the first embodiment.
Figure 16:
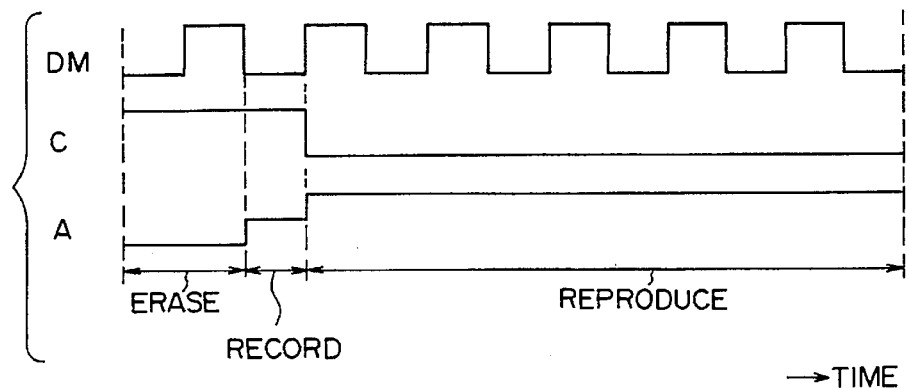

In FIG. 14, a step S16A is provided in place of the step S16 shown in FIG. 15. The step S16A erases the prerecorded signals on the magnetic tape 6 by the first magnetic head 4a during the time in which the rotary drum 5 makes a predetermined number of revolutions.

In a modification of the first embodiment shown in FIG. 15, the erasure of the prerecorded signals on the magnetic tape 6 is made for a sufficiently long time. For this reason, it is possible to sufficiently erase the signal components on the magnetic tape 6.

In a modification of the first embodiment shown in FIG. 16, the reproduction of the signals from the magnetic tape 6 is made for a sufficiently long time. Hence, it is possible to obtain a stable reproduced signal by obtaining an average of the reproduced signals within the sufficiently long time or, by extracting the reproduced signal at predetermined cycles. The performance of the magnetic tape 6 can be discriminated more accurately based on such a stable reproduced signal.

In addition, in each of the embodiments described above, the first and second magnetic heads 4a and 4b which are used to discriminate the performance of the magnetic tape 6 are not limited to a particular kind such as the heads for standard recording and reproduction and the heads for long-time (or extended play-time) recording and reproduction. Any kind of head can be effectively used in a similar manner to discriminate the performance of the magnetic tape 6. For example, it is of course possible to carry out the erasure, recording and reproduction described above using different kinds of heads.

By discriminating the performance of the magnetic tape 6, it is possible to carry out the video signal recording and/or reproduction depending on the change in the signal recording and/or reproduction that is caused by the frictional wear of the magnetic heads, for example. Hence, if the performance of the magnetic tape 6 is discriminated independently by use of the heads for the standard recording and reproduction and the heads for the long-time recording and reproduction, it is of course possible to carry out an optimum video signal recording and/or reproduction process for each of the heads for the standard recording and reproduction and the heads for the long-time recording and reproduction.

In addition, the anticipated values may be set in advance for each of the types of magnetic tape 6 that have the possibility of being used on the magnetic recording and reproducing apparatus. The types of magnetic tape 6 include a standard type which is suited for recording andreproducing signals repeatedly, a high-grade type which is suited for maintaining the recorded signals with a high quality and the like. In this case, it is possible to extract the anticipated value which most closely resembles the value of the D.C. voltage signal, and instantaneously identify the type of magnetic tape 6 based on the extracted anticipated value.

The anticipated values of the D.C. voltage signal may of course be set so that optimum recording and reproduction are always possible depending on the medium from which the video signal or the audio signal is received by the magnetic recording and reproducing apparatus. For example, the anticipated values may be set so that a broadcast digital audio signal from a satellite broadcasting, a high-definition video signal from an advanced television (ATV) such as high-vision, external input video and/or audio signals, other digital video and/or audio signals and the like can be recorded and reproduced in an optimum state.

Therefore, when recording the broadcast digital audio signal from the satellite broadcasting on to the magnetic tape 6 which is used, for example, the user can carry out the signal recording processing for enabling reproduction of an optimum digital audio signal. Furthermore, when the user carries out a dubbing operation to produce a copy of the signals recorded on the magnetic tape 6, for example, it is of course possible to carry out a detailed emphasis with respect to the video signal during the signal recording process so as to prevent signal deterioration in the dubbing operation.

In each of the embodiments described above, the reproduced FM detector 9 is constructed to generate the D.C. signal by integrating the reproduced FM signal. However, the construction of the reproduced FM detector 9 is not limited to such a construction. For example, the reproduced FM detector 9 may be constructed to successively output an envelope of the reproduced FM signal to the microcomputer 10. In this case, the performance of the magnetic tape 6 can be discriminated in the following manner.

That is, in another modification of the first embodiment, the microcomputer 10 directly detects the envelope of the reproduced FM signal. Hence, when recording the recording signal on the magnetic tape 6, for example, the microcomputer 10 carries out a control to continuously vary the recording level or the frequency of the recording signal when the magnetic head 4a or 4b makes one scan of the track pattern TP on the magnetic tape 6. In this case, the performance of the magnetic tape 6 can be discriminated by the microcomputer 10 by comparing the anticipated values and the level variations in the reproduced FM signal which is reproduced after making one recording.

Therefore, according to this other modification of the first embodiment, the microcomputer 10 can obtain the level variations in the reproduced FM signal which is obtained by reproducing the recording signal which was recorded on the magnetic tape 6 by continuously changing the recording level or the frequency, by only making one signal erasure on the magnetic tape 6, one recording of the recording signal on the magnetic tape 6 and one reproduction of the recording signal from the magnetic tape 6, that is, in only two revolutions of the rotary drum 6. For this reason, the microcomputer 10 can discriminate the performance of the magnetic tape 6 at a high speed based on the level variations in the reproduced FM signal and the anticipated values.

FIG. 17 is a flow chart for explaining this other modification of the first embodiment. In FIG. 17, those steps which are the same as those corresponding steps in FIGS. 5 and 10 are designated by the same reference numerals, and a description thereof will be omitted.

In FIG. 17, steps S17, S22, S60 and S34 are provided in place of the steps S21, S26, S31, S36 and S35a. After the step S16, the step S17 records the recording signal on the magnetic tape 6 by the second magnetic head 4b while varying the frequency of the recording signal during the time in which the rotary drum 5 makes a one-half revolution. The step S22 then reproduces the recording signal from the magnetic tape 6 by the second magnetic head 4b during a time in which the rotary drum 5 further makes one revolution. The step S60 supplies the envelope of the reproduced FM signal to the microcomputer 10, and the process advances to the step S34.

As described above, the frictional wear of the magnetic heads 4a and 4b is inevitable because the rotary drum 5 rotates at a high speed in a state where the magnetic tape 6 is wrapped around the outer peripheral surface of the rotary drum 5 thereby making contact with the magnetic heads 4a and 4b. A relatively large load is applied on the magnetic heads 4a and 4b by the contacting magnetic tape 6, and the frictional wear of the magnetic heads 4a and 4b progresses with the time for which the magnetic heads 4a and 4b are used. For this reason, even if the recording signal having the same recording level is supplied to a new unused magnetic head and a magnetic head which is used for a predetermined time, for example, the recording current level which is actually recorded on the magnetic tape 6 will be different between the two magnetic heads depending on the difference in the extents of the frictional wear of the magnetic heads.

Figure 18A:
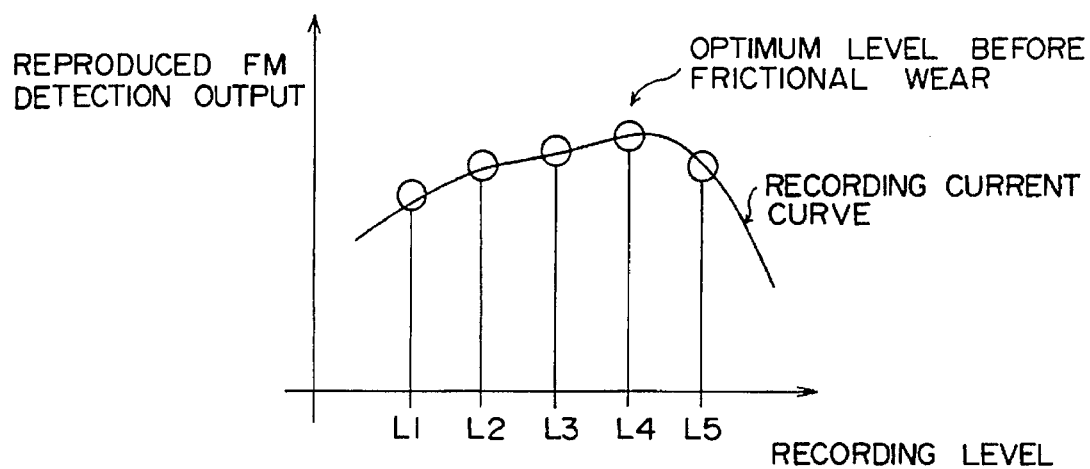
FIGS. 18A and 18B respectively are diagrams showing recording current curves for explaining the change in the optimum recording level due to frictional wear of magnetic heads.
Figure 18B:
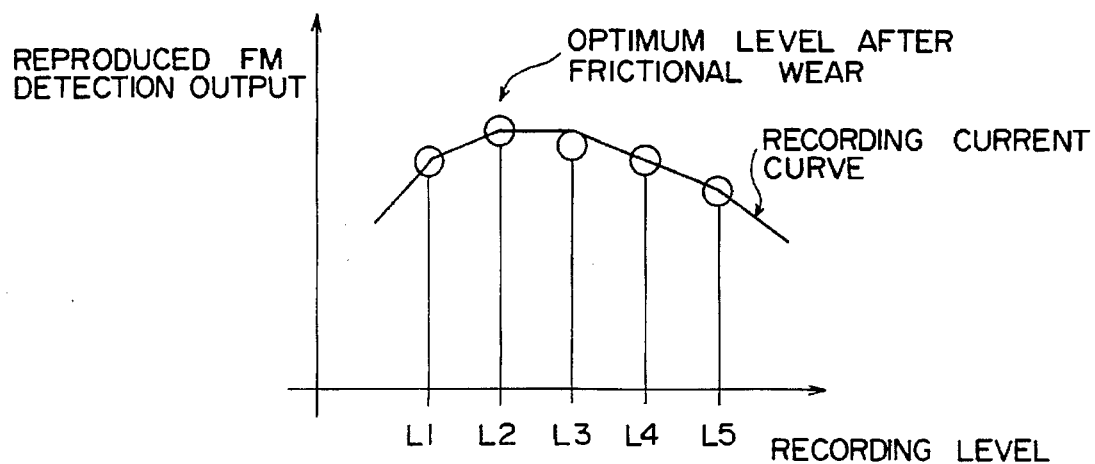

FIG. 18A shows a recording current curve of a magnetic head which is used for a time less than or equal to a predetermined time. On the other hand, FIG. 18B shows a recording current curve of a magnetic head which is used for a time exceeding the predetermined time. The change in the recording current curve from that shown in FIG. 18A to that shown in FIG. 18B is caused by the frictional wear of the magnetic head. In this particular case, an optimum recording level is a recording level L4 shown in FIG. 18A until the predetermined time, but the optimum recording level changes to a recording level L2 shown in FIG. 18B after the predetermined time is exceeded.

On the other hand, even if the same material is used for the magnetic heads, each individual magnetic head will have a characteristic peculiar thereto, and a predetermined recording level will not necessarily be the optimum recording level for each of such magnetic heads.

A Japanese Laid-Open Patent Application No.6-76212 proposes a magnetic recording and reproducing apparatus which can always record a video signal with a high picture quality regardless of the variation in the recording current level, by taking into account the frictional wear of the magnetic heads or the difference in the characteristics of the individual magnetic heads.

However, this proposed magnetic recording and reproducing apparatus predicted the variation in the optimum recording level due to the frictional wear of the magnetic head to be large, and also took into consideration the inconsistency in the performance of the magnetic tape used. As a result, it was necessary to detect at least the reproduced FM signals at the recording levels L1 through L5 in FIG. 18A, and it was inconvenient in that a long time was required to carry out the operation of setting the optimum recording level.

In addition, since the recording levels L1 through L5 are set in advance, there was a possibility that the optimum recording level of the magnetic tape will be exceeded when a signal is actually recorded on the magnetic tape at one of these recording levels L1 through L5. In this case, the recording level will saturate, and the recorded signal will be reproduced in a distorted state. Consequently, it was necessary to provide a limiter means with respect to the setting of the recording level.

On the other hand, this proposed magnetic recording and reproducing apparatus also had the following inconveniences. That is, the proposed magnetic recording and reproducing apparatus employed a recording system which transports the magnetic tape intermittently for 1 frame in every several to several hundred frames of the picture in order to realize the long-time recording of the image. The recording current was adjusted and optimized by recording and reproducing the signal that is used for the recording current adjustment during a recording pause time, where the recording pause time of the intermittent recording of the video signal occurred for every predetermined time. As a result, if the next video signal is recorded immediately after the recording pause time, the video signal became discontinuous for an amount corresponding to 1 frame. Hence, in order to prevent this discontinuity of the video signal, the magnetic tape was rewound by a distance corresponding to 1 frame, and the next video signal was recorded thereafter to maintain continuity of the video signal. Therefore, it was inconvenient in that the operation of controlling the tape transport system to rewind the magnetic tape is complicated and troublesome to perform.

In addition, because this proposed magnetic recording and reproducing apparatus records and reproduces the signal for adjusting the recording current during the recording pause time of the intermittent recording for every predetermined time, it was also inconvenient in that the recording current adjustment is inefficient. In other words, a detection circuit detects the recording and reproducing times for every predetermined time, and a switch for setting the recording current is set depending on the detection made in the detection circuit. Hence, the recording and reproduction of the signal for adjusting the recording current must be carried out each time, and the operation of adjusting the recording current to an optimum value is not very efficient.

Next, a description will be given of another aspect of the present invention which eliminates the above described inconveniences of the proposed magnetic recording and reproducing apparatus. More particularly, according to this other aspect of the present invention, the recording current is always adjusted to an optimum value depending on the state of use of the magnetic heads, regardless of whether or not the video signal is to be recorded for a long time.

FIG. 19 shows the construction of a fourth embodiment of the magnetic recording and reproducing apparatus according to the present invention. In FIG. 19, those parts which are the same as those corresponding parts in FIG. 2 are designated by the same reference numerals, and a description thereof will be omitted.

In FIG. 19, a time detecting circuit 16 is coupled to the microcomputer 10 and detects the time for which the magnetic heads 4a and 4b are used. The time detecting circuit 16 detects the use of the magnetic heads 4a and 4b when a current is supplied to the magnetic heads 4a and 4b during the recording or reproduction. Although the switch 12 is illustrated in FIG. 19 as having only the contact a which receives the normal input signal such as the luminance signal and the contact b which receives the recording signal, it is of course possible to employ the switch 12 shown in FIG. 2 in combination with the D.C. power supplies DC1 and DC2 or DC3 shown in FIG. 9.

The recording amplifier 2 varies the recording level in steps depending on the gain control signal B. The amplified signal from the recording amplifier 2 is supplied to the contact R of the switch 3 as the recording signal. In this embodiment, it is assumed for the sake of convenience that the recording amplifier 2 varies the recording level in 3 steps, namely, levels L2, L3 and L4.

Figure 20A:
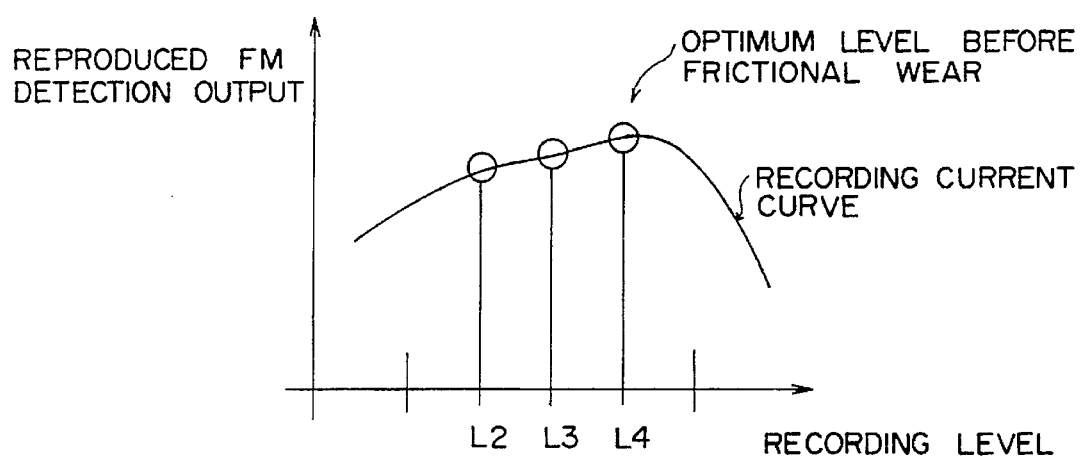
FIGS. 20A and 20B respectively are diagrams showing recording current curves for explaining the change in the optimum recording level due to the frictional wear of the magnetic heads in the fourth embodiment.

Information related to the recording current characteristic of the magnetic heads 4a and 4b is accumulated from experience and stored in the microcomputer 10 or the memory 11 depending on the time for which the magnetic heads 4a and 4b are used. In other words, information indicative of the recording current curve or characteristic shown in FIG. 20A is stored in the microcomputer 10 or the memory 11. For example, the microcomputer 10 sets the highest recording levels L2, L3 and L4 depending on the recording current characteristic shown in FIG. 20A.

The reproduced signal which is amplified to a predetermined level in the preamplifier 8 is converted into a reproduced D.C. signal by the reproduced FM detector 9. This reproduced D.C. signal corresponds to the reproduced FM detection output shown in FIG. 20A, and is supplied to the microcomputer 10. The microcomputer 10 compares the reproduced D.C. signal and the recording current characteristic of the magnetic heads 4a and 4b, and detects the recording level with which the maximum value of the reproduced D.C. signal is obtained.

The recording current characteristic of the magnetic heads 4a and 4b made of the same material is prestored in the microcomputer 10 or the memory 11 in correspondence with each stage of the frictional wear of the magnetic heads 4a and 4b depending on the time for which the magnetic heads 4a and 4b are used. For example, a boundary where the recording current characteristic of the magnetic head changes due to the frictional wear is denoted by a predetermined time T1. The recording level is set along a predetermined recording current characteristic until the magnetic heads 4a and 4b are used for the predetermined time T1. But when the magnetic heads 4a and 4b are used for a time exceeding the predetermined time T1, it is judged that the frictional wear of the magnetic heads 4a and 4b progressed beyond a certain point and that the recording current characteristic has changed. Hence, after the predetermined time T1, the recording level is set along the changed recording current characteristic.

The time for which the magnetic heads 4a and 4b are used may be obtained in the microcomputer 10 by measuring a time from a time when the power supply of the magnetic recording and reproducing apparatus is turned ON to a time when this power supply is turned OFF. Alternatively, it is possible to count the pulses of the drum pulse signal DM in the microcomputer 10 from a time when the rotation of the rotary drum 5 starts to a time when the rotation of the rotary drum 5 stops in a state where the magnetic tape 6 is wrapped around the outer peripheral surface of the rotary drum 5. The drum pulse signal DM is used to control the rotation of the rotary drum 5 and is generated in synchronism with the rotation of the rotary drum. Of course, the time for which the magnetic heads 4a and 4b are used may be detected by other appropriate means.

The reproduced D.C. signal which is supplied to the microcomputer 10 takes values corresponding to the recording levels L2 through L4 shown in FIG. 20A. Hence, the microcomputer 10 compares the recording current characteristic of the magnetic heads 4a and 4b and the reproduced D.C. signal, and detects the recording level which corresponds to the reproduced D.C. signal having the maximum value. In this particular case, the recording level L4 shown in FIG. 20A is detected as the recording level which corresponds to the reproducing D.C. signal having the maximum value.

The microcomputer 10 supplies the gain control signal B to the recording amplifier 2 so as to set the gain of the recording amplifier 2 to the detected recording level L4. In addition, the microcomputer 10 supplies the switch control signal A to the switch 12 so that the switch 12 outputs the normal input signal which is supplied to the magnetic recording and reproducing apparatus. Of course, the normal input signal supplied to the contact a of the switch 12 may be the luminance signal, the video signal and/or the audio signal.

The normal input signal is subjected to a known signal processing and is amplified to the optimum recording level L4 in the recording amplifier 2. This normal input signal having the optimum recording level L4 is recorded on the magnetic tape 6 by being supplied to the magnetic heads 4a and 4b via the switches 3 and 7. As a result, it is possible to record a desired signal on the magnetic tape 6 with the optimum recording level and to reproduce this desired signal from the magnetic tape 6.

Next, a description will be given of a case where the recording and reproduction are repeated in this embodiment, and the time for which the magnetic heads 4a and 4b are used exceeds the predetermined time T1. In this case, when the user inputs an instruction for putting the magnetic recording and reproducing apparatus to the recording mode to the microcomputer 10, the time detecting circuit 16 supplies to the microcomputer 10 the time detection information which indicates that the time for which the magnetic heads 4a and 4b are used has exceeded the predetermined time T1. The microcomputer 10 thus judges that the frictional wear of the magnetic heads 4a and 4b has progressed, and that the recording current characteristic of the present magnetic heads 4a and 4b has changed to the recording current characteristic shown in FIG. 20B.

Figure 20B:
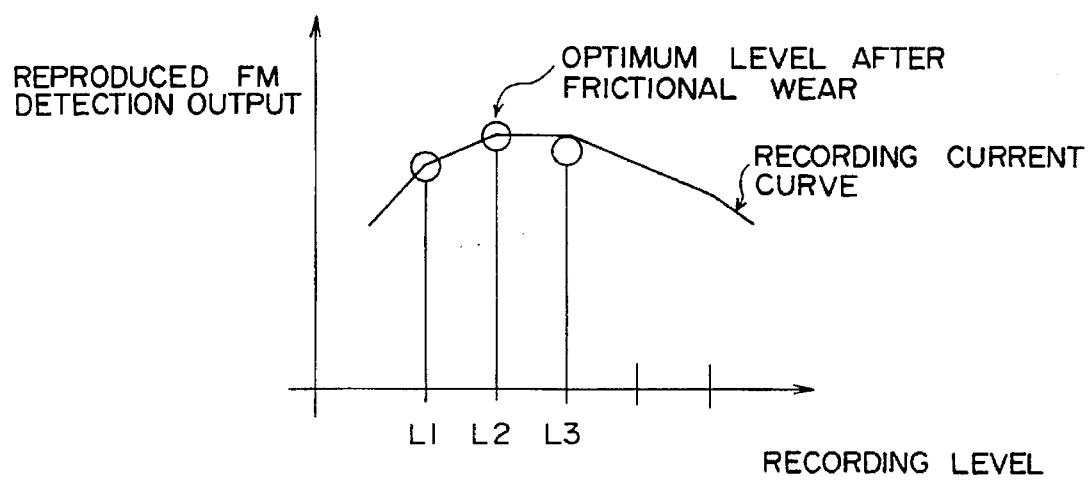

Responsive to the time detection information, the microcomputer 10 supplies the gain control signal B to the recording amplifier 2 so as to set the recording level to a high recording level such as the levels L1 through L3 shown in FIG. 20B depending on the recording current characteristic shown in FIG. 20B. The microcomputer 10 also supplies the switch control signal A to the switch 12 so that the switch 12 outputs the recording signal.

Accordingly, the recorded track on the magnetic tape 6 is erased, the recording signal is recorded on the track of the magnetic tape 6, and the recording signal is reproduced from the track of the magnetic tape 6 in a state where the magnetic tape 6 is stationary. As a result, the microcomputer 10 obtains the reproduced D.C. signal shown in FIG. 20B. The microcomputer 10 compares the reproduced D.C. signals which are obtained, and detects the recording level with which the maximum level of the reproduced D.C. signal is obtained. In this particular case, the recording level L2 is detected as the recording level with which the maximum level of the reproduced D.C. signal is obtained. Hence, the microcomputer 10 supplies the gain control signal B to the recording amplifier 2 so as to set the recording level of the recording amplifier 2 to the recording level L2.

Therefore, although the magnetic heads 4a and 4b are used for the time exceeding the predetermined time T1, the optimum recording level which is dependent on the frictional wear of the magnetic heads 4a and 4b is set in the recording amplifier 2. Thus, by supplying the switch control signal A from the microcomputer 10 to the switch 12 and supplying the normal input signal from the switch 12 to the recording amplifier 2, it is possible to record this normal input signal on the magnetic tape 6 with the optimum recording level which is dependent on the frictional wear of the magnetic heads 4a and 4b.

Figure 21:
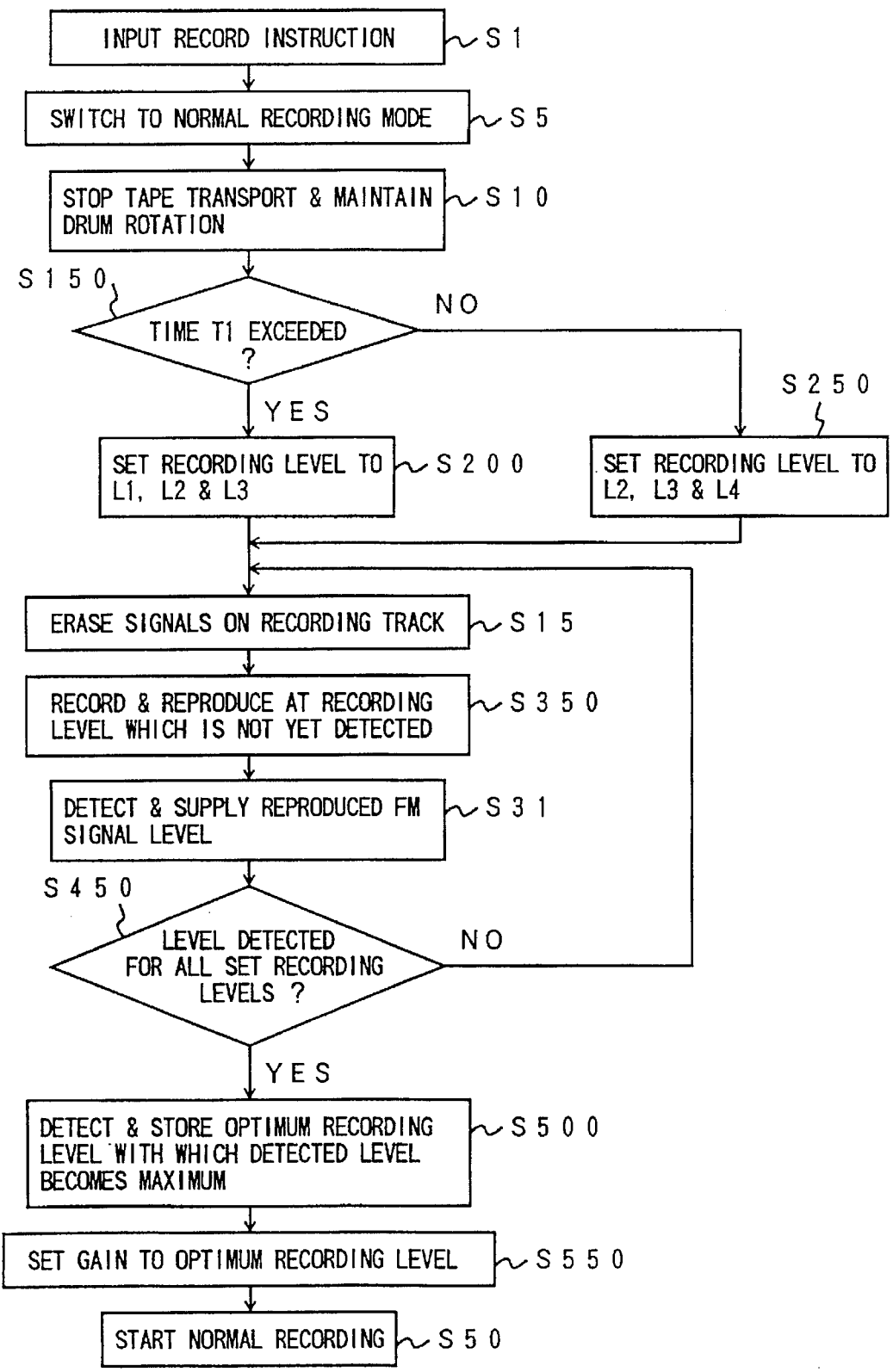
FIG. 21 is a flow chart for explaining the operation of the fourth embodiment.

FIG. 21 is a flow chart for explaining the operation of the fourth embodiment. In FIG. 21, those steps which are the same as those corresponding steps in FIGS. 1, 5 and 7 are designated by the same reference numerals, and a description thereof will be omitted.

In FIG. 21, after the step S10, a step S150 decides whether or not the magnetic heads 4a and 4b are used for a time exceeding the predetermined time T1. If the decision result in the step S150 is NO, a step S250 sets the recording level of the recording amplifier 2 to the levels L2, L3 and L4, and the process advances to the step S15. On the other hand, if the decision result in the step S150 is YES, a step S200 sets the recording level of the recording amplifier 2 to the levels L1, L2 and L3, and the process advances to the step S15.

After the step S15, a step S50 carries out the recording and reproduction at the recording level which is not yet detected out of the recording levels set in the recording amplifier 2, and the process advances to the step S31. After the step S31, a step S450 decides whether or not the level of the reproduced FM signal has been detected for all of the recording levels set in the recording amplifier 2, and the process returns to the step S15 if the decision result in the step S450 is NO.

On the other hand, if the decision result in the step 6450 is YES, a step S500 detects the optimum recording level at which the detected level of the reproduced FM signal becomes the maximum, and stores the optimum recording level in the memory 11. In addition, a step 6550 sets the gain of the recording amplifier 2 to the optimum recording level, and the process advances to the step S50.

Figure 22:
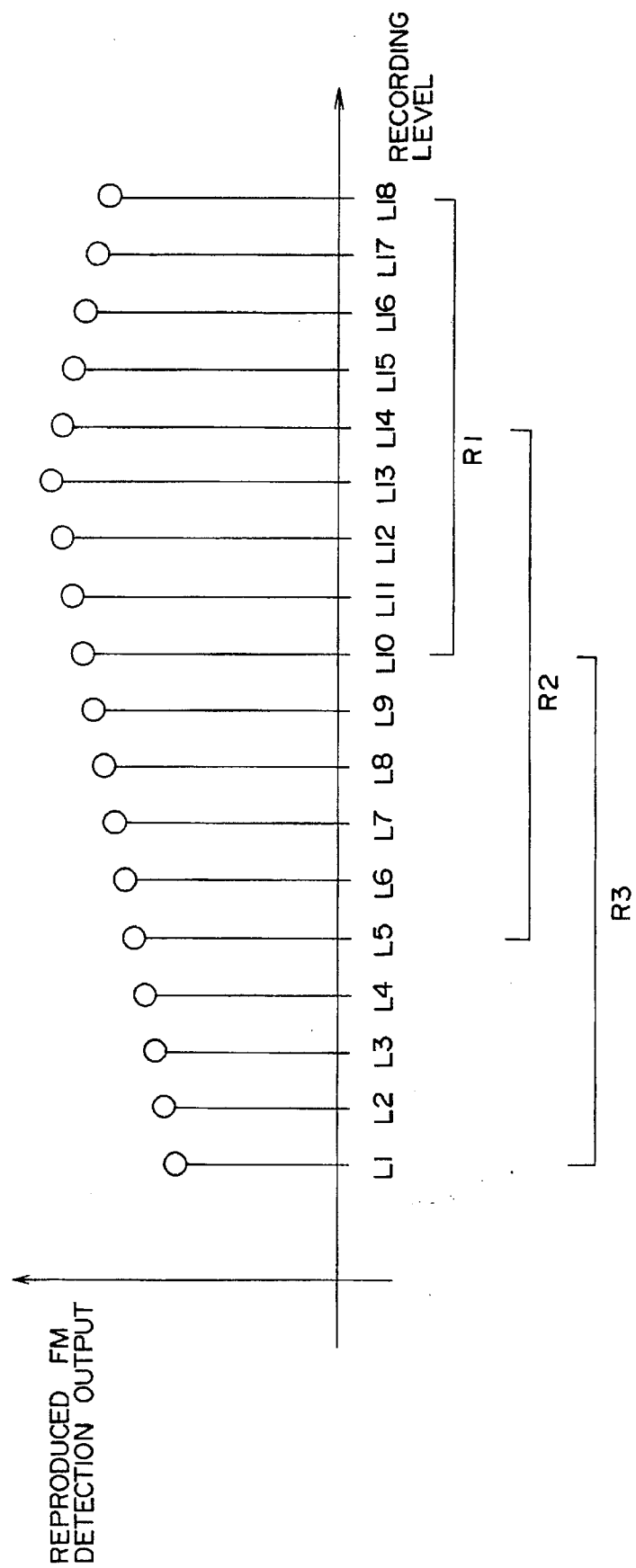
FIG. 22 is a diagram for explaining a modification of the fourth embodiment.

In a modification of the fourth embodiment, the optimum recording level is more finely detected from the recording current characteristic of the magnetic heads 4a and 4b. In other words, the optimum recording level need not be limited to the 3 recording levels, and it is possible to obtain the maximum reproduced D.C. signal from the recording current characteristic of the magnetic heads 4a and 4b. For example, as shown in FIG. 22, it may be assumed that the maximum value of the recording current characteristic of the magnetic heads 4a and 4b exists within a range R1 up to the predetermined time T1, the maximum value of the recording current characteristic of the magnetic heads 4a and 4b exists within a range R2 when the predetermined time T1 is exceeded, and the maximum value the recording current characteristic of the magnetic heads 4a and 4b exists within a range R3 when the magnetic heads 4a and 4b are used for a time which is considerably longer than the predetermined time T1. In this case, the optimum recording level is detected from the ranges R1 through R3 of the recording current characteristic of the magnetic heads 4a and 4b.

Because the optimum recording level is obtained from the level along the recording current characteristic of the magnetic heads 4a and 4bit is possible to prevent the erroneously set recording level from saturating and to prevent reproduction of a distorted signal which is recorded with the saturated recording level. In other words, it is possible to always obtain the optimum recording level without the use of a limiter means.

In addition, even if the optimum recording levels are inconsistent among the individual magnetic heads, it is possible to obtain the optimum recording level for each individual magnetic head by obtaining the reproduced D.C. signal from the recording current characteristics of the magnetic heads which are made of the same material and are stored in advance in the microcomputer 10 or the memory 11. For this reason, it is possible to obtain approximately an ideal optimum recording level for each individual magnetic head by absorbing the inconsistencies among the individual magnetic heads.

Furthermore, since the optimum recording level is obtained from the reproduced D.C. signal which is obtained by actually recording the recording signal on the magnetic tape 6 and reproducing this recording signal from the magnetic tape 6, it is possible to obtain the optimum recording level which also takes into account the performance of the magnetic tape 6, similarly to the first through third embodiments described above.

Of course, the recording level can be detected from any of the recording levels L1 through L4 shown in FIGS. 20A and 20B or, from any of the ranges R1 through R3 of the recording levels shown in FIG. 22, and the order in which the recording levels are detected is not limited to a specific order.

Figure 23:
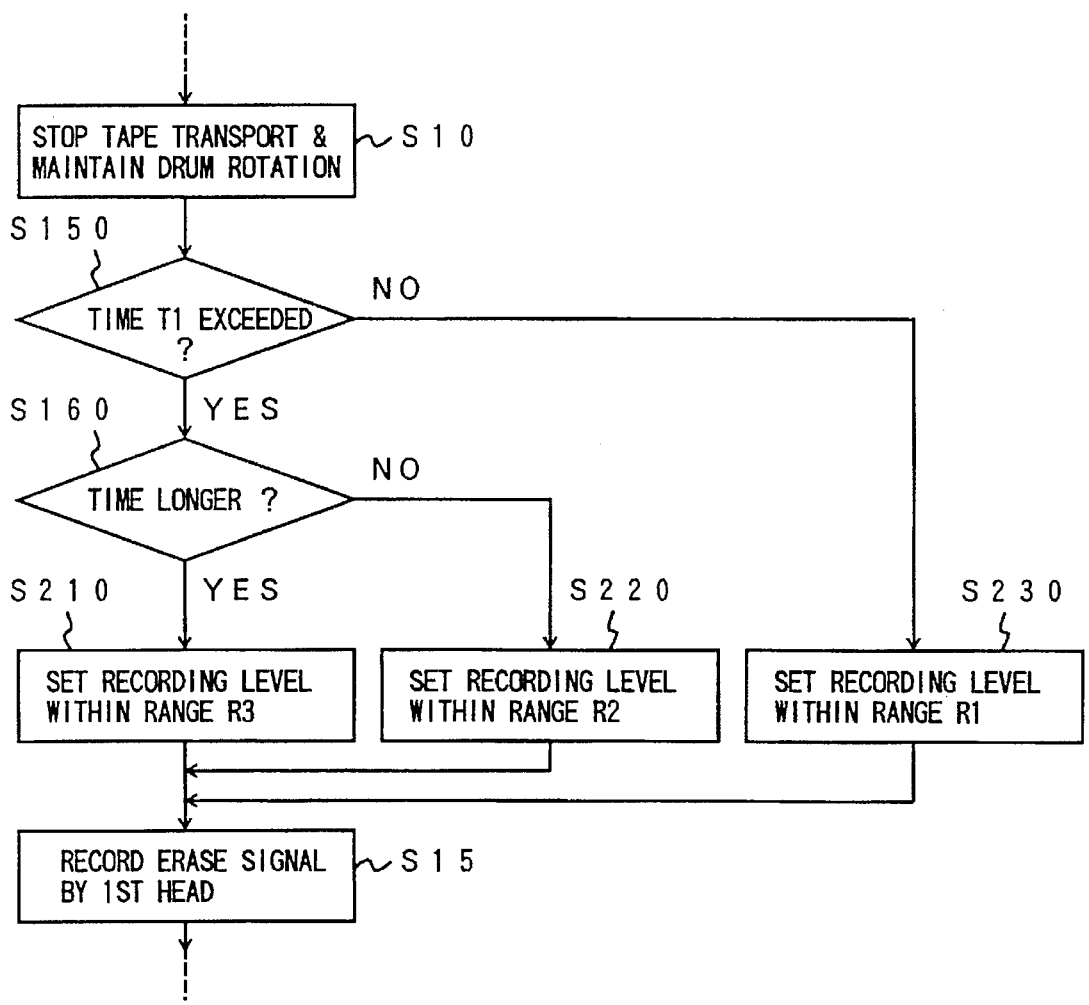
FIGS. 23 and 24 respectively are flow charts for explaining the operations of further modifications of the fourth embodiment.

FIG. 23 is a flow chart for explaining another modification of the fourth embodiment in which the recording level is detected from any of the ranges R1 through R3 of the recording levels shown in FIG. 22. In FIG. 23, those steps which are the same as those corresponding steps in FIG. 21 are designated by the same reference numerals, and a description thereof will be omitted.

In FIG. 23, steps S160, S210, S220 and S230 are provided between the steps S10 and S15 in place of the steps S200 and S250 shown in FIG. 21. If the decision result in the step S150 is YES, the step S160 decides whether or not the time for which the magnetic heads 4a and 4b are used has become considerably longer than the predetermined time T1. A step S210 sets the recording level of the recording amplifier 2 to the recording level within the range R3 if the decision result in the step S160 is YES, and the process advances to the step S15. On the other hand, the step S220 sets the recording level of the recording amplifier 2 to the recording level within the range R2 if the decision result in the step S160 is NO, and the process advances to the step S15. If the decision result in the step S150 is NO, the step S230 sets the recording level of the recording amplifier 2 to the recording level within the range R1, and the process advances to the step S15.

The optimum recording level which is obtained in the above described manner changes depending on the time for which the magnetic heads 4a and 4b are used, however, this change will not occur within a short time of 1 or 2 hours. For this reason, once the optimum recording level is set, it is of course possible to continue using the same optimum recording level for a certain time.

In another modification of the fourth embodiment, the microcomputer 10 stores the recording level which is detected in the above described manner into the memory 11, for example. In this case, until the time detecting circuit 16 detects a certain time such as the predetermined time T1, it is possible to continuously use the recording level which is stored in the memory 11.

Figure 24:
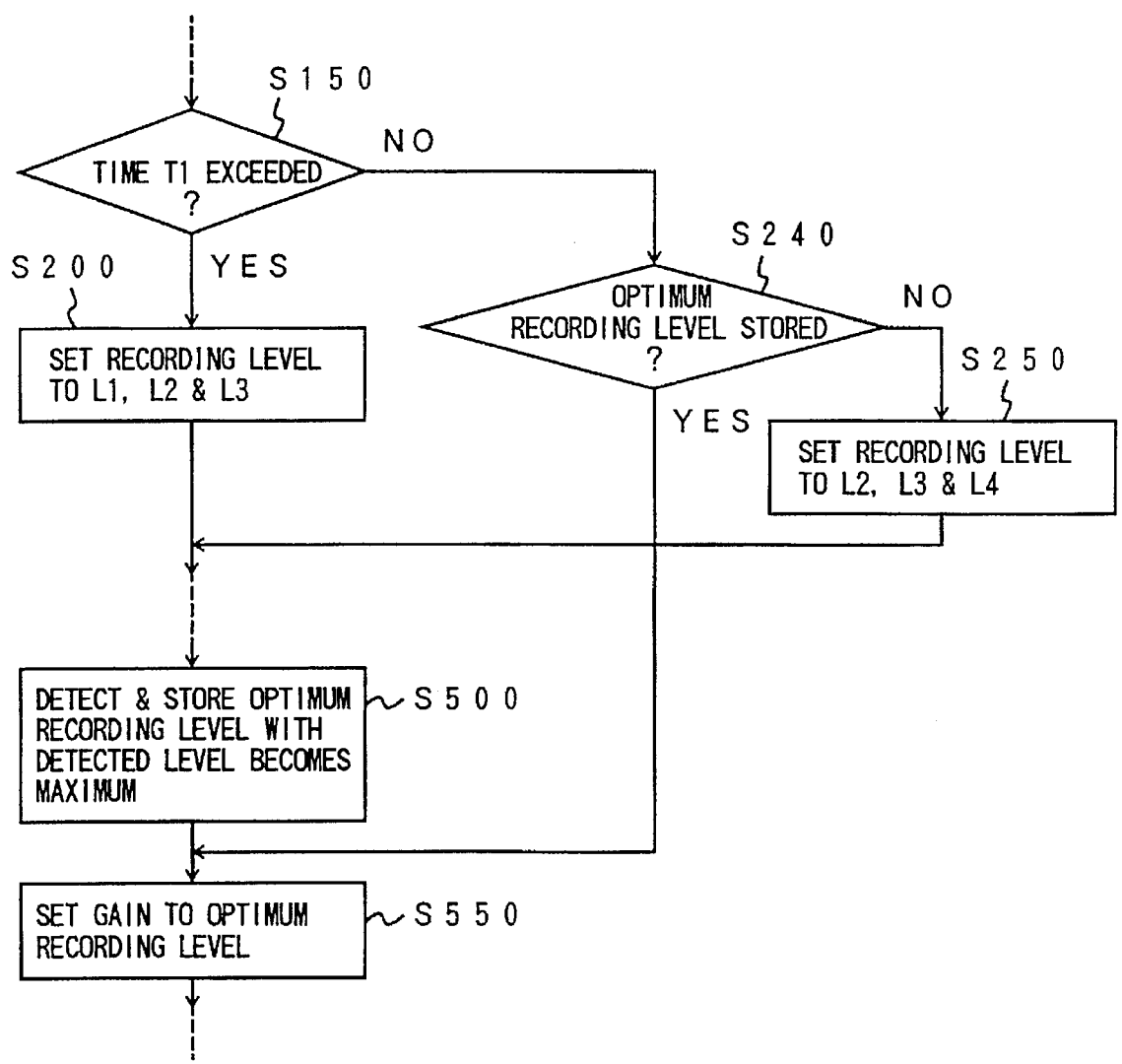

FIG. 24 is a flow chart for explaining the operation of this modification of the fourth embodiment. In FIG. 24, those steps which are the same as those corresponding steps in FIG. 21 are designated by the same reference numerals, and a description thereof will be omitted.

In FIG. 24, a step S240 is provided in addition to those steps shown in FIG. 21. If the decision result in the step S150 is NO, the step S240 decides whether or not the optimum recording level is stored in the memory 11. The process advances to the step S250 if the decision result in the step S240 is NO. On the other hand, the process advances to the step S550 if the decision result in the step S240 is YES.

Of course, it is possible to combine the fourth embodiment or its modification and any of the first through third embodiments or modifications thereof described above.

Further, the present invention is not limited to these embodiments, but various variations and modifications may be made without departing from the scope of the present invention.

What is claimed is:

1. A magnetic recording and reproducing apparatus which records a signal on a recording track of a magnetic recording medium in a recording mode and reproduces the signal from the recording track of the magnetic recording medium in a reproducing mode, said magnetic recording and reproducing apparatus comprising:

a rotary drum having at least first and second magnetic heads having gaps with mutually different azimuth angles;

erasing means for erasing the signal recorded on the recording track of the magnetic recording medium by supplying a high-frequency current to the first magnetic head in a state where the magnetic recording medium which makes contact with said rotary drum is stationary;

recording means for supplying a predetermined signal to the second magnetic head so as to record the predetermined signal on the recording track which is erased by said erasing means;

detection means for detecting the predetermined signal by immediately reproducing by the second magnetic head the predetermined signal which is recorded on the recording track by said recording means; and control means including discriminating means for discriminating a signal recording and reproducing characteristic of the magnetic recording medium based on the predetermined signal detected by said detection means.

2. The magnetic recording and reproducing apparatus as claimed in claim 1, wherein:

said recording means records the predetermined signal which is set with a purality of gains on the recording track which is erased by said erasing means; and said detection means detects a maximum level of the predetermined signal which is reproduced from the recording track.

3. The magnetic recording and reproducing apparatus as claimed in claim 2, which further comprises:

first signal processing means for carrying out a first signal processing with respect to a signal to be recorded on the recording track; and second signal processing means for carrying out a second signal processing which is complementary to the first signal processing with respect to the signal reproduced from the recording track.

4. The magnetic recording and reproducing apparatus as claimed in claim 3, wherein said control means controls said first signal processing means in the recording mode based on the signal recording and reproducing characteristic discriminated by said discriminating means and controls said second signal processing means in the reproducing mode based on the signal recording and reproducing characteristic discriminated by said discriminating means.

5. The magnetic recording and reproducing apparatus as claimed in claim 4, wherein said control means controls said first signal processing means in the recording mode and controls said second signal processing means in the reproducing mode respectively based on a comparison of the maximum level of the predetermined signal detected by said detection means and a reference value which is set in advance.

6. The magnetic recording and reproducing apparatus as claimed in claim 1, wherein said erasing means and said recording means respectively output an erase signal and the predetermined signal based on independent D.C. voltage signals.

7. The magnetic recording and reproducing apparatus as claimed in claim 1, wherein the first and second magnetic heads have gaps with mutually opposite azimuth angles.

8. The magnetic recording and reproducing apparatus as claimed in claim 1, wherein:

said erasing means erases the signal on the recording track in synchronism with a timing with which the first magnetic head scans the magnetic recording medium; and said recording means records the predetermined signal on the recording track in synchronism with a timing with which the second magnetic head scans the magnetic recording medium.

9. The magnetic recording and reproducing apparatus as claimed in claim 1, which further comprises:

setting means for setting a recording level of the predetermined signal within a predetermined range; and time detecting means for detecting a time for which the first and second magnetic heads are used, said control means including means for variably controlling the predetermined range in which said setting means sets the recording level of the predetermined signal based on the time detected by said time detecting means, and means for setting the recording level with which the predetermined signal detected by said detection means takes a maximum value as an optimum recording level to be set by said setting means.

10. The magnetic recording and reproducing apparatus as claimed in claim 9, which further comprises:

memory means for storing the optimum recording level set by said control means.

11. The magnetic recording and reproducing apparatus as claimed in claim 1, which further comprises:

setting means for setting a recording level of the predetermined signal within a predetermined range; and time detecting means for detecting a time for which the first and second magnetic heads are used, said control means including means for variably controlling the predetermined range in which said setting means sets the recording level of the predetermined signal immediately before said recording means records the predetermined signal on the recording track based on the time detected by said time detecting means, and means for setting the recording level with which the predetermined signal detected by said detection means takes a maximum value as an optimum recording level to be set by said setting means.

12. The magnetic recording and reproducing apparatus as claimed in claim 11, which further comprises:

memory means for storing the optimum recording level set by said control means.

13. A magnetic recording and reproducing apparatus which records a signal on a recording track of a magnetic recording medium in a recording mode and reproduces the signal from the recording track of the magnetic recording medium in a reproducing mode, said magnetic recording and reproducing apparatus comprising:

a rotary drum having at least first and second magnetic heads having gaps with mutually different azimuth angles;

recording means for supplying a predetermined signal to one of the first and second magnetic heads so as to record the predetermined signal on the recording track;

detection means for detecting the predetermined signal by immediately reproducing by said one of the first and second magnetic heads the predetermined signal which is recorded on the recording track by said recording means;

setting means for setting a recording level of the predetermined signal within a predetermined range;

time detecting means for detecting a time for which the first and second magnetic heads are used; and control means including means for variably controlling the predetermined range in which said setting means sets the recording level of the predetermined signal based on the time detected by said time detecting means, and means for setting the recording level with which the predetermined signal detected by said detection means takes a maximum value as an optimum recording level to be set by said setting means.

14. The magnetic recording and reproducing apparatus as claimed in claim 13, wherein said control means includes means for variably controlling the predetermined range in which said setting means sets the recording level of the predetermined signal immediately before said recording means records the predetermined signal on the recording track based on the time detected by said time detecting means.

15. The magnetic recording and reproducing apparatus as claimed in claim 13, which further comprises:

memory means for storing the optimum recording level set by said control means.

* * * * *